United States Patent
Tribble et al.

(10) Patent No.: US 12,458,405 B2
(45) Date of Patent: Nov. 4, 2025

(54) METATARSOPHALANGEAL JOINT IMPLANTS AND METHODS THEREOF

(71) Applicant: HYALEX ORTHOPAEDICS, INC., Lexington, MA (US)

(72) Inventors: Mary Tribble, Somerville, MA (US); James Craig Fryman, Middleton, MA (US); Michael E. Hawkins, Columbia City, IN (US); Brad Vale, Santa Clara, CA (US); Daniel C. Taylor, Littleton, MA (US); Jessica Indyk, Mansfield, MA (US); Julia Beekman, Brighton, MA (US); Carl Vause, Concord, MA (US); Mary Elizabeth Schmidt, Pomfret Center, CT (US)

(73) Assignee: HYALEX ORTHOPAEDICS, INC., Lexington, MA (US)

( * ) Notice: Subject to any disclaimer, the term of this patent is extended or adjusted under 35 U.S.C. 154(b) by 0 days.

(21) Appl. No.: 19/013,762

(22) Filed: Jan. 8, 2025

(65) Prior Publication Data
US 2025/0221738 A1     Jul. 10, 2025

Related U.S. Application Data

(60) Provisional application No. 63/618,471, filed on Jan. 8, 2024.

(51) Int. Cl.
*A61F 2/42* (2006.01)
*A61B 17/56* (2006.01)
*A61F 2/30* (2006.01)

(52) U.S. Cl.
CPC .......... *A61B 17/562* (2013.01); *A61F 2/4225* (2013.01); *A61F 2002/30224* (2013.01); *A61F 2002/4233* (2013.01)

(58) Field of Classification Search
None
See application file for complete search history.

(56) References Cited

U.S. PATENT DOCUMENTS

| 4,156,296 | A |   | 5/1979 | Johnson et al. |
| 4,642,122 | A | * | 2/1987 | Steffee ............... A61F 2/4225  623/21.19 |

(Continued)

FOREIGN PATENT DOCUMENTS

| CA | 3233740 A1 | 3/2023 |
| DE | 19820749 A1 | 11/1999 |

(Continued)

OTHER PUBLICATIONS

Yang et al., "A Synthetic Hydrogel Composite with the Mechanical Behavior and Durability of Cartilage", Advanced Functional Materials, 2020, vol. 30, 2003451, 8 pages.

(Continued)

*Primary Examiner* — Alvin J Stewart
(74) *Attorney, Agent, or Firm* — GOODWIN PROCTER LLP

(57) ABSTRACT

Systems, methods, and devices described herein relate an implant adapted to be placed in a bone in the metatarsophalangeal joint or a metacarpophalangeal joint. In some embodiments, the implant includes a head portion extending from a first surface to a second surface and having a plurality of layers located between the first surface and the second surface. In some embodiments, the first surface is lubricious. In some embodiments, the implant comprises a post portion extending from the second surface of the head portion to a bone facing surface.

20 Claims, 12 Drawing Sheets

(56) References Cited

U.S. PATENT DOCUMENTS

| | | | |
|---|---|---|---|
| 5,037,440 A * | 8/1991 | Koenig | A61B 17/1659 623/21.19 |
| 5,326,366 A * | 7/1994 | Pascarella | A61F 2/4225 623/21.19 |
| 5,458,648 A | 10/1995 | Berman et al. | |
| 5,624,463 A * | 4/1997 | Stone | C08L 1/00 623/23.61 |
| 5,919,196 A * | 7/1999 | Bobic | A61F 2/4618 606/88 |
| 6,626,950 B2 * | 9/2003 | Brown | A61L 27/425 623/23.72 |
| 6,926,739 B1 * | 8/2005 | O'Connor | A61B 17/1775 623/20.29 |
| 7,204,854 B2 * | 4/2007 | Guederian | A61F 2/4081 623/908 |
| 7,264,634 B2 * | 9/2007 | Schmieding | A61F 2/30756 623/908 |
| 7,591,820 B2 * | 9/2009 | Schmieding | A61B 17/1635 606/79 |
| 7,758,643 B2 * | 7/2010 | Stone | A61F 2/30756 623/23.61 |
| 7,909,880 B1 | 3/2011 | Grant | |
| 7,959,681 B2 * | 6/2011 | Lavi | A61F 2/4606 623/21.19 |
| 8,303,664 B1 * | 11/2012 | Burstein | A61F 2/4225 623/20.14 |
| 8,591,592 B2 * | 11/2013 | Dreyfuss | A61B 17/1684 623/908 |
| 8,652,211 B1 * | 2/2014 | Jerry, Jr. | A61F 2/4225 623/21.19 |
| 8,882,845 B2 * | 11/2014 | Wirth | A61F 2/4081 623/19.13 |
| 9,095,641 B2 * | 8/2015 | Albertorio | A61F 2/30756 |
| 9,554,916 B2 | 1/2017 | Miller | |
| 10,624,748 B2 * | 4/2020 | Ek | A61F 2/40 |
| 10,653,527 B1 * | 5/2020 | Serafin, Jr. | A61F 2/3094 |
| 11,058,545 B2 | 7/2021 | Carioscia | |
| 11,478,358 B2 * | 10/2022 | Miniaci | A61B 17/1684 |
| 11,607,319 B2 * | 3/2023 | Ek | A61F 2/30749 |
| 11,660,202 B2 * | 5/2023 | Denham | A61F 2/4225 623/21.19 |
| 11,759,327 B2 | 9/2023 | Bailey | |
| 2002/0022889 A1 * | 2/2002 | Chibrac | A61B 17/1684 623/18.11 |
| 2003/0220700 A1 * | 11/2003 | Hammer | A61L 27/58 623/23.75 |
| 2004/0193175 A1 * | 9/2004 | Maroney | A61B 90/06 606/102 |
| 2004/0230315 A1 * | 11/2004 | Ek | A61B 17/1764 623/901 |
| 2005/0065612 A1 * | 3/2005 | Winslow | A61F 2/4014 623/19.14 |
| 2005/0165487 A1 * | 7/2005 | Muhanna | A61F 2/4425 623/17.15 |
| 2005/0222687 A1 * | 10/2005 | Vunjak-Novakovic | A61L 27/3654 623/908 |
| 2005/0251268 A1 * | 11/2005 | Truncale | A61F 2/30756 623/23.63 |
| 2006/0052725 A1 * | 3/2006 | Santilli | A61F 2/4606 623/20.11 |
| 2006/0229726 A1 * | 10/2006 | Ek | A61F 2/30942 623/17.11 |
| 2006/0235541 A1 * | 10/2006 | Hodorek | A61F 2/30756 623/23.51 |
| 2007/0005143 A1 * | 1/2007 | Ek | A61B 17/1675 623/20.32 |
| 2007/0093896 A1 * | 4/2007 | Malinin | A61F 2/28 623/908 |
| 2007/0179608 A1 * | 8/2007 | Ek | A61F 2/30756 623/23.39 |
| 2008/0051912 A1 * | 2/2008 | Hollawell | A61F 2/4225 606/279 |
| 2008/0195215 A1 * | 8/2008 | Morton | A61F 2/4225 623/18.11 |
| 2008/0243262 A1 * | 10/2008 | Lee | A61F 2/3868 623/20.29 |
| 2010/0185294 A1 * | 7/2010 | Ek | A61F 2/30767 623/18.11 |
| 2010/0241236 A1 * | 9/2010 | Katrana | A61F 2/3804 623/20.11 |
| 2010/0249942 A1 * | 9/2010 | Goswami | A61F 2/4225 623/21.19 |
| 2010/0256758 A1 * | 10/2010 | Gordon | A61F 2/30756 623/16.11 |
| 2010/0262254 A1 | 10/2010 | Lawrence et al. | |
| 2010/0268238 A1 * | 10/2010 | Sikora | A61F 2/4081 606/87 |
| 2011/0009964 A1 * | 1/2011 | Schwartz | A61F 2/4618 623/14.12 |
| 2011/0035012 A1 * | 2/2011 | Linares | A61F 2/3854 623/18.11 |
| 2011/0054609 A1 * | 3/2011 | Cook | A61F 2/30756 623/13.12 |
| 2011/0054611 A1 * | 3/2011 | Wu | A61F 2/30756 623/16.11 |
| 2011/0093085 A1 * | 4/2011 | Morton | A61B 17/15 623/21.19 |
| 2011/0125277 A1 * | 5/2011 | Nygren | A61F 2/30756 623/20.14 |
| 2011/0153023 A1 * | 6/2011 | Deffenbaugh | A61F 2/4081 623/19.11 |
| 2011/0184528 A1 * | 7/2011 | Beckendorf | A61F 2/4225 623/23.42 |
| 2012/0323338 A1 * | 12/2012 | Vanasse | A61F 2/4241 623/21.15 |
| 2013/0090740 A1 * | 4/2013 | Linares | A61F 2/4225 623/21.19 |
| 2013/0110252 A1 * | 5/2013 | Bake | A61F 2/30756 623/23.57 |
| 2013/0304226 A1 | 11/2013 | Ritz et al. | |
| 2014/0257299 A1 * | 9/2014 | Berelsman | A61B 17/1675 606/80 |
| 2014/0277552 A1 * | 9/2014 | Burstein | A61F 2/30724 623/21.19 |
| 2015/0250594 A1 | 9/2015 | Ek | |
| 2015/0351921 A1 | 12/2015 | Miller | |
| 2016/0128837 A1 * | 5/2016 | Juszczyk | B28B 1/008 156/154 |
| 2016/0151076 A1 | 6/2016 | Bake et al. | |
| 2017/0020678 A1 * | 1/2017 | Lauf | A61F 2/4241 |
| 2017/0027710 A1 * | 2/2017 | Jefferis | A61F 2/30942 |
| 2017/0100251 A1 * | 4/2017 | Ek | A61F 2/38 |
| 2017/0143351 A1 | 5/2017 | Devitre et al. | |
| 2017/0367838 A1 | 12/2017 | Cavanagh et al. | |
| 2018/0153697 A1 * | 6/2018 | Vitale | A61B 17/1682 |
| 2018/0154041 A1 * | 6/2018 | Altschuler | A61L 27/54 |
| 2018/0353301 A1 * | 12/2018 | Goldstein | A61B 17/8061 |
| 2019/0142598 A1 * | 5/2019 | Koenig | A61B 17/15 623/21.19 |
| 2019/0240037 A1 * | 8/2019 | Gorelick | A61F 2/30749 |
| 2019/0358042 A1 * | 11/2019 | Taylor | A61F 2/4225 |
| 2019/0358048 A1 * | 11/2019 | Carioscia | A61F 2/4225 |
| 2020/0107937 A1 * | 4/2020 | Denham | A61F 2/4606 |
| 2021/0030550 A1 * | 2/2021 | Ek | A61F 2/4606 |
| 2021/0059829 A1 * | 3/2021 | Montross | A61F 2/4225 |
| 2021/0085468 A1 * | 3/2021 | Ryd | A61F 2/30756 |
| 2021/0113344 A1 * | 4/2021 | Bailey | A61B 17/1775 |
| 2021/0128306 A1 * | 5/2021 | Taylor | A61F 2/30756 |
| 2021/0128307 A1 * | 5/2021 | Taylor | A61F 2/4618 |
| 2021/0383931 A1 * | 12/2021 | Spångberg | A61F 2/3859 |
| 2022/0241078 A1 * | 8/2022 | Hermsen | A61F 2/3094 |
| 2022/0249239 A1 * | 8/2022 | Williams | A61F 2/30756 |
| 2022/0257382 A1 * | 8/2022 | Hermsen | B29C 43/003 |
| 2022/0346965 A1 * | 11/2022 | Schwartz | A61F 2/4657 |
| 2023/0190492 A1 * | 6/2023 | Marks | A61F 2/30767 606/79 |
| 2023/0301794 A1 * | 9/2023 | Marks | A61F 2/4225 |

(56) References Cited

U.S. PATENT DOCUMENTS

| | | | |
|---|---|---|---|
| 2023/0381376 A1* | 11/2023 | Wiley | C08L 1/02 |
| 2023/0414230 A1 | 12/2023 | Schwartz et al. | |
| 2024/0024113 A1* | 1/2024 | Torbati | A61F 2/30756 |
| 2024/0207052 A1* | 6/2024 | Oevering | A61L 27/446 |
| 2024/0238094 A1* | 7/2024 | Wiley | A61L 27/06 |
| 2024/0260852 A1* | 8/2024 | Berlet | A61B 5/1074 |
| 2024/0299175 A1* | 9/2024 | Ogilvie | A61F 2/4684 |
| 2024/0325154 A1* | 10/2024 | Ryd | A61B 17/1775 |
| 2024/0390154 A1* | 11/2024 | Julin | A61F 2/461 |
| 2025/0025304 A1* | 1/2025 | Mai | A61F 2/4225 |
| 2025/0057658 A1* | 2/2025 | Arnold | A61F 2/30771 |

FOREIGN PATENT DOCUMENTS

| | | | | |
|---|---|---|---|---|
| DE | 102004043700 A1 * | 3/2006 | | A61F 2/4225 |
| DE | 102016224483 A1 * | 6/2017 | | A61F 2/42 |
| EP | 3013256 B1 | 11/2018 | | |
| FR | 2727308 A1 | 5/1996 | | |
| FR | 2787013 A1 * | 6/2000 | | A61B 17/86 |
| FR | 2858545 A1 | 2/2005 | | |
| FR | 2926212 A1 * | 7/2009 | | A61F 2/3603 |
| FR | 2940759 A1 * | 7/2010 | | A61F 2/4241 |
| FR | 2940760 A1 * | 7/2010 | | A61F 2/4241 |
| FR | 2997293 A1 | 5/2014 | | |
| GB | 2308068 A | 6/1997 | | |
| WO | 9616613 A1 | 6/1996 | | |
| WO | WO-0103613 A1 * | 1/2001 | | A61F 2/4225 |
| WO | WO-0180772 A1 * | 11/2001 | | A61F 2/30 |
| WO | WO-2004026185 A1 * | 4/2004 | | A61F 2/4225 |
| WO | 2006052874 A2 | 1/2006 | | |
| WO | 2006099886 A1 | 9/2006 | | |
| WO | WO-2007148220 A2 * | 12/2007 | | A61F 2/4225 |
| WO | WO-2009073924 A1 * | 6/2009 | | A61F 2/4225 |
| WO | WO-2014068210 A1 * | 5/2014 | | A61F 2/4225 |
| WO | 2014207151 A1 | 12/2014 | | |
| WO | WO-2016115172 A1 * | 7/2016 | | A61F 2/4225 |
| WO | WO-2019022712 A1 * | 1/2019 | | A61B 17/1775 |
| WO | WO-2021015831 A1 * | 1/2021 | | A61F 2/30 |
| WO | WO-2021150490 A1 * | 7/2021 | | A61B 17/1682 |

OTHER PUBLICATIONS

Zhao et al., "High-Strength Hydrogel Attachment through Nanofibrous Reinforcement", Advanced Healthcare Materials, 2021, vol. 10, 2001119, 7 pages.

Zhao et al., "A Synthetic Hydrogel Composite with a Strength and Wear Resistance Greater than Cartilage", Advanced Functional Materials, 2022, vol. 32, 2205662, 10 pages.

PCT/US2025/010774 International Search Report and Written Opinon mailed on Apr. 14, 2025, 14 pages.

* cited by examiner

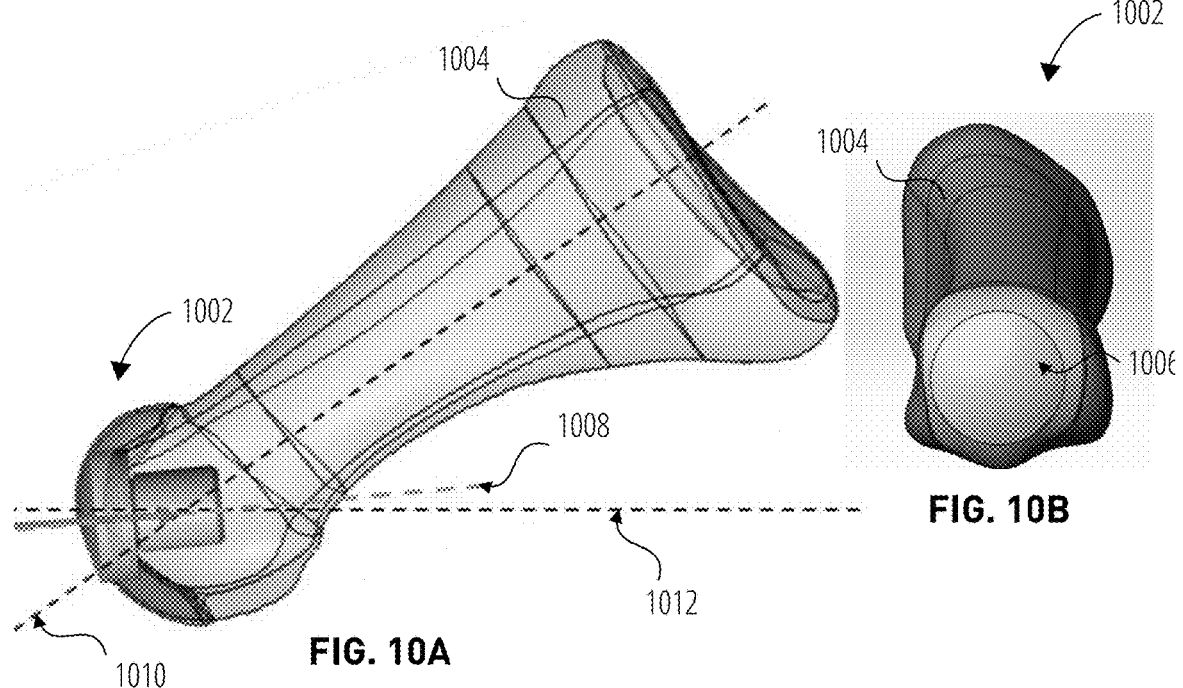
FIG. 10A
FIG. 10B
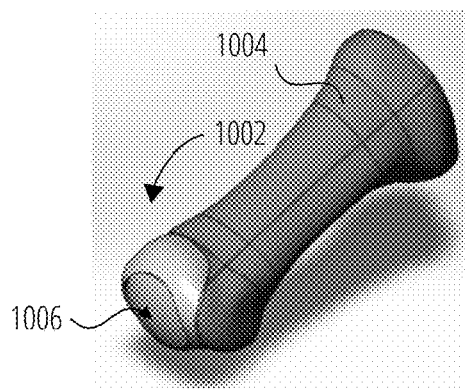
FIG. 10C

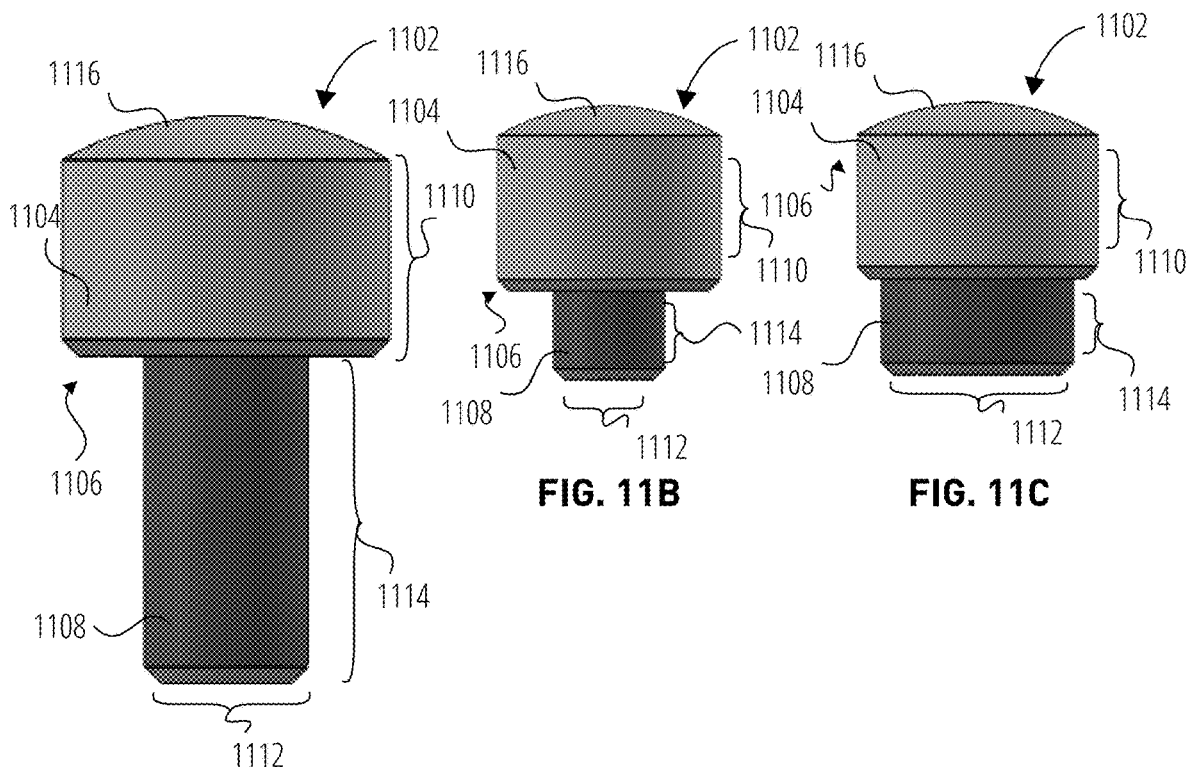
FIG. 11A  FIG. 11B  FIG. 11C
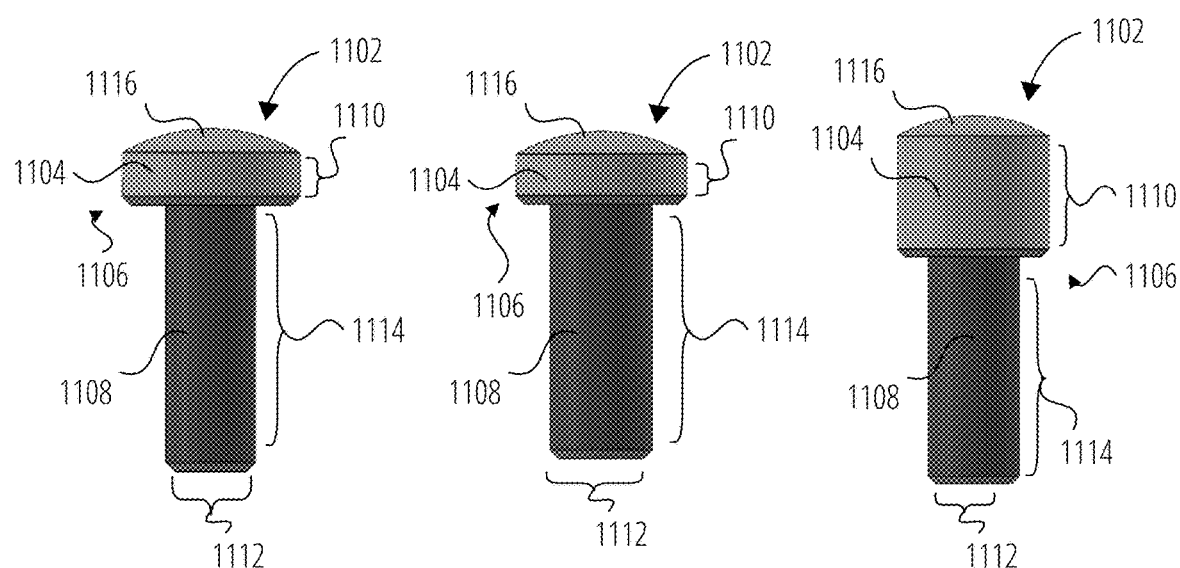
FIG. 11D  FIG. 11E  FIG. 11F

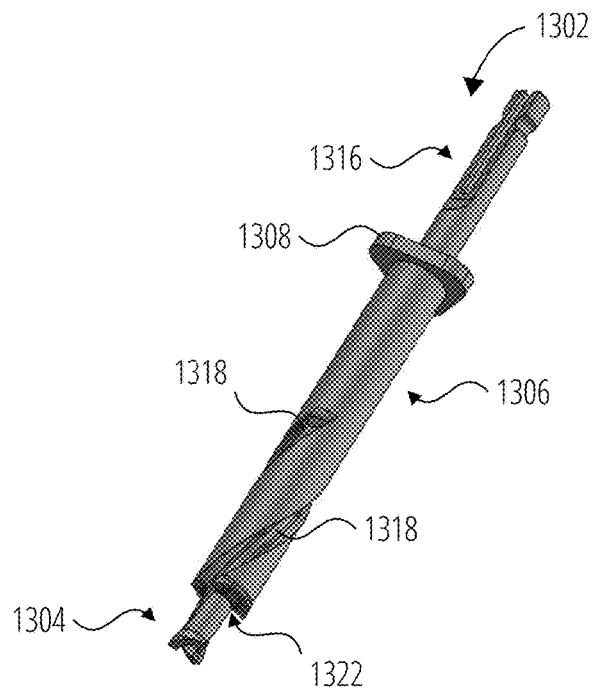
FIG. 13A
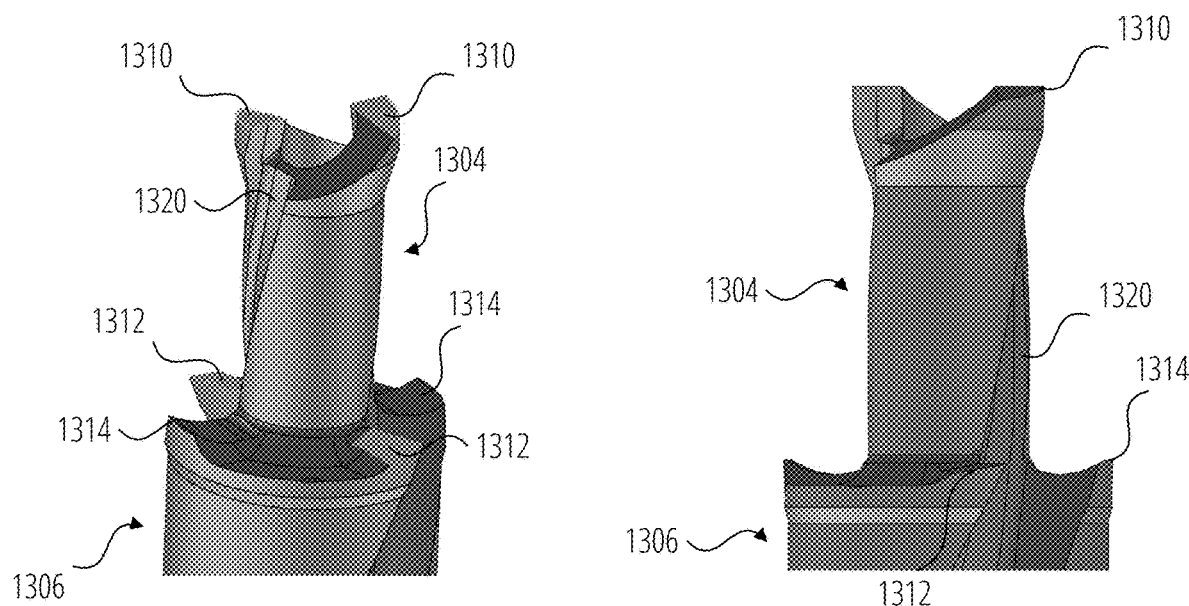
FIG. 13B
FIG. 13C

METATARSOPHALANGEAL JOINT IMPLANTS AND METHODS THEREOF

CROSS-REFERENCE TO RELATED APPLICATIONS

This application claims the benefit of U.S. Provisional Patent Application No. 63/618,471, filed on Jan. 8, 2024, which is fully incorporated herein by reference.

BACKGROUND

A metatarsophalangeal joint hemiarthroplasty is a surgical procedure designed to address specific conditions affecting the metatarsophalangeal joint, which is the joint connecting the metatarsal bones (long bones in the foot) to the phalanges (toe bones). This procedure is typically employed when conservative treatments have proven ineffective in alleviating pain and/or restoring function in the joint. For example, conservative treatments for metatarsophalangeal joint issues may involve non-surgical approaches such as medications, physical therapy, orthotic devices, and lifestyle modifications to alleviate pain and improve function.

When these conservative treatments are ineffective, a metatarsophalangeal joint hemiarthroplasty may be needed. During a metatarsophalangeal joint hemiarthroplasty, a surgeon aims to replace the damaged or diseased articular surfaces of the joint with prosthetic components. This is done to restore joint stability, reduce pain, and improve overall function.

The ultimate goal of the procedure is to enhance the patient's quality of life by providing a durable and functional joint replacement, thereby reducing pain and improving overall foot function. For example, the conventional treatment of fusion of two bones may result in pain for the patient and reduced mobility.

BRIEF SUMMARY

In one aspect, an implant adapted to be placed in an articulating surface of a metatarsophalangeal joint, the implant includes a head portion extending for a thickness from a first surface to a second surface and includes a plurality of layers located between the first surface and the second surface, where the first surface is lubricious, and a post portion extending for a length from the second surface of the head portion to a distal end. The implant may also include where a ratio of the thickness of the head portion to a diameter of the post portion is between 1:1 to 1:5 The implant may also include where a ratio of a diameter of the head portion to a diameter of the post portion is between 1.0:1.0 to 1.0:2.5. The implant may also include where a ratio of the length of the post portion to the thickness of the head portion is between 1.0:0.3 to 1.0:7.0. The implant may also include where the length of the post is between 6-20 mm. The implant may also include where a diameter of the post is between 4-10 mm. The implant may also include where the thickness of the head portion is between 3-20 mm. The implant may also include where the first surface includes a first curvature and a second curvature, the first curvature extending along a first axis, the second curvature extending along a second axis, where the first axis and the second axis intersect at a single point, and where the first axis and the second axis are orthogonal to a longitudinal axis of the implant. The implant may also include where the implant is configured to articulate with native cartilage of a corresponding bone. The implant may also include further includes a cavity at least partially disposed into the distal end of the post portion, where the cavity extends along a longitudinal axis of the post portion. The implant may also include further includes a foot portion extending from the head portion in a direction towards the distal end of the post portion. The implant may also include where the first curvature and the second curvature are both convex. The implant may also include where the first curvature and the second curvature are both concave. The implant may also include where the first curvature is convex and the second curvature is concave. The implant may also include where the first curvature is concave and the second curvature is convex. The implant may also include where the first curvature has a more acute angle than the second curvature. The implant may also include further includes a first lumen extending at least partially through a latitudinal axis of the post portion. The implant may also include further includes one or more fins extending radially from an outer surface of the post portion. Other technical features may be readily apparent to one skilled in the art from the following figures, descriptions, and claims. In one aspect, an implant adapted to be placed in an articulating surface of a metacarpophalangeal joint, the implant includes a head portion extending for a thickness from a first surface to a second surface and includes a plurality of layers located between the first surface and the second surface, where the first surface is lubricious, and a post portion extending for a length from the second surface of the head portion to a distal end. The implant may also include where a ratio of the thickness of the head portion to a diameter of the post portion is between 1:1 to 1:5 The implant may also include where a ratio of a diameter of the head portion to a diameter of the post portion is between 1.0:1.0 to 1.0:2.5. The implant may also include where a ratio of the length of the post portion to the thickness of the head portion is between 1.0:0.3 to 1.0:7.0. The implant may also include where the length of the post is between 6-20 mm. The implant may also include where a diameter of the post is between 4-10 mm. The implant may also include where the thickness of the head portion is between 3-20 mm. The implant may also include where the first surface includes a first curvature and a second curvature, the first curvature extending along a first axis, the second curvature extending along a second axis, where the first axis and the second axis intersect at a single point, and where the first axis and the second axis are orthogonal to a longitudinal axis of the implant. The implant may also include where the implant is configured to articulate with native cartilage of a corresponding bone. The implant may also include further includes a cavity at least partially disposed into the distal end of the post portion, where the cavity extends along a longitudinal axis of the post portion. The implant may also include further includes a foot portion extending from the head portion in a direction towards the distal end of the post portion. The implant may also include where the first curvature and the second curvature are both convex. The implant may also include where the first curvature and the second curvature are both concave. The implant may also include where the first curvature is convex and the second curvature is concave. The implant may also include where the first curvature is concave and the second curvature is convex. The implant may also include where the first curvature has a more acute angle than the second curvature. The implant may also include further includes a first lumen extending at least partially through a latitudinal axis of the post portion. The implant may also include further includes one or more fins extending radially from an outer surface of the post portion. Other technical features may be readily apparent to one skilled in the art from the following figures, descriptions, and claims. The implant may also include where the ratio of the thickness of the head portion to the diameter of the post portion is between 1:1 to 1:3. The implant may also include where the ratio of the thickness of the head portion to the diameter of the post portion is between 1.0:1.2 to 1.0:1.8. The implant may also include where the ratio of the diameter of the head portion to the diameter of the post portion is between 1.0:1.5 to 1.0:2.25. The implant may also include where the ratio of the diameter of the head portion to the diameter of the post portion is between 1.0:1.6 to 1.0:1.8. The implant may also include where the ratio of the length of the post portion to the thickness of the head portion is between 1.0:0.5 to 1.0:5.0. The implant may also include where the ratio of the length of the post portion to the thickness of the head portion is between 1.0:1.2 to 1.0:1.7. The implant may also include where the length of the post is between 8.2-8.4 mm. The implant may also include where the diameter of the post is between 4-8 mm. The implant may also include where the diameter of the post is between 4.5-7.0 mm. The implant may also include where the thickness of the head portion is between 4-12 mm. The implant may also include wherein the thickness of the head portion is between 5-7 mm. The implant may also include where a diameter of the head portion is between 4-25 mm. The implant may also include where the diameter of the head portion is between 6-18 mm. The implant may also include where the diameter of the head portion is between 8-12 mm. The implant may also include where a corresponding implant has an articulating surface includes a material selected from the group consisting of a lubricious material, cobalt-chromium, titanium, Ti6Al4V, ultra-high molecular weight polyethylene, or any combination thereof. The implant may also include further includes a post extension having a first end configured to be at least partially disposed in bone and a second end configured to mate with the cavity of the post portion. The implant may also include where the first surface of the head portion extends along the length of the foot portion. The implant may also include further includes a second lumen extending at least partially through the latitudinal axis of the post portion. The implant may also include where the first lumen is oriented perpendicular to the second lumen. The implant may also include where the one or more fins comprise a shape memory material. The implant may also include where the shape memory material is nitinol. In another aspect, embodiments described herein relate to a system adapted to be placed in an articulating surface of a metatarsophalangeal joint, the system includes the metatarsophalangeal implant and a phalangeal implant configured to articulate with the metatarsal implant. In some embodiments, the first surface of the implant comprises a curvature oriented orthogonal to a longitudinal axis of the implant.

In one aspect, a method for disposing an implant at least partially into a metatarsal bone in a metatarsophalangeal joint, the method includes the steps of disposing a recess through an articular surface of a metatarsal head of the metatarsal bone such that the metatarsal head maintains articulation with a sesamoid bone, and inserting the implant into the metatarsal bone at an angle between 15-30 degrees with respect to a longitudinal axis of the metatarsal bone. The method may also include where the implant includes a head portion and a post portion extending from the head portion, where the implant further includes a foot portion extending from the head portion towards a distal end of the foot portion, thereby creating an articulating surface with a phalangeal bone. The method may also include where the implant includes a head portion and a post portion extending from the head portion, where the implant further includes a cavity at least partially disposed into a distal end of the post portion, where the cavity extends along a longitudinal axis of the post portion. The method may also include where the recess is formed by contacting a distal end of a drill bit with an articular surface of the metatarsal bone, and where the method further includes the steps of forming a first cavity of the recess with a first drill bit portion having a first drill bit diameter about equal to a diameter of the post portion of the implant, forming a second cavity of the recess with a second drill bit portion having a second drill diameter about equal to a diameter of the head portion of the implant, where a distal end of the first drill bit portion extends distally from a distal end of the second drill bit portion, and where the first drill bit diameter is smaller than the first drill bit diameter. The method may also include where the implant includes a head portion and a post portion extending from the head portion, where a first surface of the head portion is convex having a substantially spherical curvature. The method may also include where the implant includes a head portion and a post portion extending from the head portion, where a first surface of the head portion includes a first curvature and a second curvature. The method may also include further includes inserting a trial implant into the recess to visually inspect a relative location of the articular surface and the trial implant. The method may also include where the metatarsal head includes at least 2 mm of bone surrounding the recess. The method may also include further includes visually evaluating a pin guide against the articular surface, such that the pin guide has a diameter that is equal to a diameter of the recess. The method may also include further includes the step of inserting an alignment pin into the recess. Other technical features may be readily apparent to one skilled in the art from the following figures, descriptions, and claims. In one aspect, a method for disposing an implant at least partially into a metacarpal bone in a metacarpophalangeal joint, the method includes the steps of disposing a recess through an articular surface of a metacarpal head of the metatarsal bone such that the metacarpal head maintains articulation with a sesamoid bone, and inserting the implant into the metacarpal bone. The method may also include where the implant includes a head portion and a post portion extending from the head portion, where the implant further includes a foot portion extending from the head portion towards a distal end of the foot portion, thereby creating an articulating surface with a phalangeal bone. The method may also include where the implant includes a head portion and a post portion extending from the head portion, where the implant further includes a cavity at least partially disposed into a distal end of the post portion, where the cavity extends along a longitudinal axis of the post portion. The method may also include where the recess is formed by contacting a distal end of a drill bit with an articular surface of the metatarsal bone, and where the method further includes the steps of forming a first cavity of the recess with a first drill bit portion having a first drill bit diameter about equal to a diameter of the post portion of the implant, forming a second cavity of the recess with a second drill bit portion having a second drill diameter about equal to a diameter of the head portion of the implant, where a distal end of the first drill bit portion extends distally from a distal end of the second drill bit portion, and where the first drill bit diameter is smaller than the first drill bit diameter. The method may also include where the implant includes a head portion and a post portion extending from the head portion, where a first surface of the head portion is convex having a substantially spherical curvature. The method may also include where the implant includes a head portion and a post portion extending from the head portion, where a first surface of the head portion includes a first curvature and a second curvature. The method may also include further includes inserting a trial implant into the recess to visually inspect a relative location of the articular surface and the trial implant. The method may also include where the metacarpal head includes at least 2 mm of bone surrounding the recess. The method may also include further includes visually evaluating a pin guide against the articular surface, such that the pin guide has a diameter that is equal to a diameter of the recess. The method may also include further includes the step of inserting an alignment pin into the recess. Other technical features may be readily apparent to one skilled in the art from the following figures, descriptions, and claims. The method may also include where the drill bit includes a depth guide configured to contact a drill guide when then drill bit reaches a final depth of the recess. The method may also include further where the implant includes a post extension having a first end configured to be at least partially disposed in the metatarsal bone and a second end configured to couple with the cavity of the post portion. The method may also include where a first surface of the head portion extends along the length of the foot portion. The method may also include where the first curvature has a more acute angle than the second curvature. The method may also include where the trial implant includes a defined etched band disposed along a circumference of the trial implant. The method may also include where the articular surface is located proximally to a distal border of the defined etched band and distally to a proximal border of the defined etched band when the trial implant is inserted into the recess. The method may also include where the articular surface is aligned with the proximal edge of the defined etched band when the trial implant is inserted into the recess. The method may also include where the pin guide makes three points of contact against the articular surface. The method may also include where the alignment pin is inserted into the recess to a depth where the alignment pin remains stable. The method may also include where the alignment pin is inserted into the recess to a depth to a depth of 30-40 mm or 40-50 mm. Other technical features may be readily apparent to one skilled in the art from the following figures, descriptions, and claims.

BRIEF DESCRIPTION OF THE SEVERAL VIEWS OF THE DRAWINGS

Figures illustrated herein are exemplary block drawings showing relative positions of certain elements described herein. However, the figures do not show the exact couplings or connections that may or may not exist between elements. Additionally, in some drawings, internal and external features may be shown in the same renderings for conceptualizing the overall concepts and not for conceptualizing them from an engineering perspective.

FIG. 10A illustrates an example of an implant inserted into a bone, according to an embodiment described herein.

FIG. 10B illustrates an example of a joint-facing, top-down view of an implant inserted into a bone along a dorsal angulation axis.

FIG. 10C illustrates an example of the implant of FIG. 10A and FIG. 10B from another perspective, wherein the implant inserted into a bone.

FIG. 11A-FIG. 11F illustrate various embodiments of an implant having a plug portion of various thicknesses and a post portion having various corresponding diameters and lengths.

FIG. 13A illustrates an example a surgical implant drill bit, according to embodiments described herein.

FIG. 13B illustrates a planar view of a tip of the surgical implant drill of FIG. 13A, according to embodiments described herein.

FIG. 13C illustrates an isometric view of a tip of the surgical implant drill of FIG. 13A, according to embodiments described herein.

DETAILED DESCRIPTION

Figure 1A:
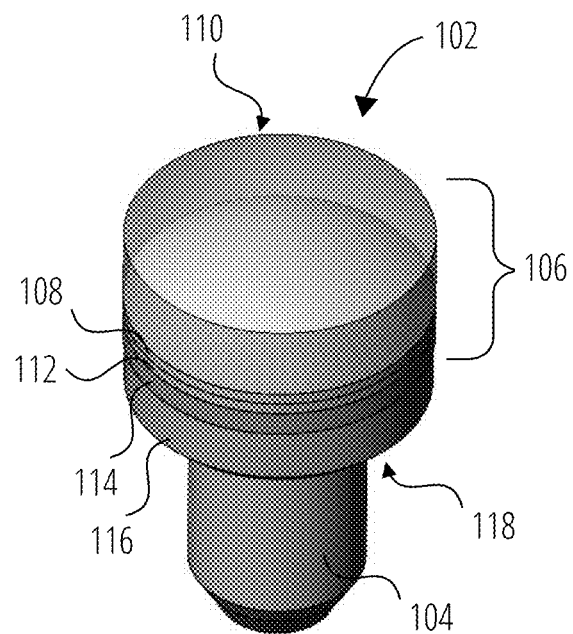
FIG. 1A illustrates an example of an isometric view of an implant, according to an embodiment described herein.

Unless defined otherwise, all technical and scientific terms used herein have the same meaning as is commonly understood by one of skill in the art to which the claimed subject matter belongs. It is to be understood that the foregoing general description and the following detailed description are exemplary and explanatory only and are not restrictive of any subject matter claimed. The section headings used herein are for organizational purposes only and are not to be construed as limiting the subject matter described.

As used herein, singular forms "a," "and," and "the" include plural referents unless the context clearly indicates otherwise. Thus, e.g., reference to "a channel" includes a single channel or a plurality of channels.

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

The term "coupled" is defined as connected, although not necessarily directly, and not necessarily mechanically; two items that are "coupled" may be unitary with each other.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any embodiment of the present apparatuses, kits, and methods, the term "substantially" may be substituted with "within [a percentage] of" what is specified, where the percentage includes 0.1, 1, 5, and/or 10 percent.

As used herein, all numerical values or numerical ranges include whole integers within or encompassing such ranges and fractions of the values or the integers within or encompassing ranges unless the context clearly indicates otherwise. Thus, e.g., reference to a range of 90-100%, includes 91%, 92%, 93%, 94%, 95%, 95%, 97%, etc., as well as 91.1%, 91.2%, 91.3%, 91.4%, 91.5%, etc., 92.1%, 92.2%, 92.3%, 92.4%, 92.5%, etc., and so forth. In another example, reference to a range of 1-5,000-fold includes 1, 2, 3, 4, 5, 6, 7, 8, 9, 10, 11, 12, 13, 14, 15, 16, 17, 18, 19, 20-fold, etc., as well as 1.1, 1.2, 1.3, 1.4, 1.5-fold, etc., 2.1, 2.2, 2.3, 2.4, 2.5-fold, etc., and so forth.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus or kit that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Further, an apparatus, device or system that is configured in a certain way is configured in at least that way, but it can also be configured in other ways than those specifically described.

Any embodiment of any of the present apparatuses and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

As used herein, the term "about" means within ±10% of the value it modifies. For example, "about 1" means "0.9 to 1.1", "about 2%" means "1.8% to 2.2%", "about 2% to 3%" means "1.8% to 3.3%", and "about 3% to about 4%" means "2.7% to 4.4%." Unless otherwise clear from the context, all numerical values provided herein are modified by the term "about".

A metatarsophalangeal (MTP) joint hemiarthroplasty is a surgical procedure designed to address specific conditions affecting the metatarsophalangeal joint, which is the joint connecting the metatarsal bone (long bone in the foot) to the phalanges in the foot (toe bone) by replacing at least a portion of one of the articulating surfaces with an implant. Previous approaches have considered fusing the two bones together which may cause pain and a reduced range of motion for the patient.

A metacarpophalangeal (MCP) joint hemiarthroplasty is a similar surgical procedure designed to address specific conditions affecting the metacarpal bone (long bone in the hand) to the phalanges in the hands (finger bone). MCP (Metacarpophalangeal) arthroplasty is a surgical procedure performed to replace the damaged or diseased joint surfaces of the metacarpophalangeal joints, which are located at the base of the fingers.

As used herein, phalanges refers to either phalanges in the foot (toe bone) or the phalanges in the hand (finger bone) depending on which joint is being referenced. When the metatarsophalangeal joint is discussed, phalanges refers to the phalanges in the foot. When the metacarpophalangeal joint is discussed, phalanges refers to the phalanges in the hand.

The metacarpophalangeal (MCP) joints, located at the base of the fingers, connect the metacarpal bones of the hand to the proximal phalanges of the fingers. Each of the five metacarpal bones in the palm has a rounded, convex head that articulates with the base of a corresponding proximal phalanx, forming the MCP joint. These joints are crucial for finger mobility and dexterity, allowing for movements such as flexion, extension, abduction, and adduction, and they play an essential role in gripping and manipulating objects.

Previous approaches to replace the articulating surface of joints with an implant include using materials such as metals or a hard polymeric bearing surfaces which may provide complications in mismatched mechanical properties with the cartilage of the corresponding bone, potentially leading to cartilage degeneration, osteoarthritis, and/or tearing of the corresponding cartilage. Furthermore, traditional approaches include removing a distal end of the articulating bone which may make revision surgery challenging due to lack of healthy native bone.

Systems, methods, and devices described herein provide implants configured to prevent cartilage degeneration of the corresponding articular surface and/or preserve native bone. For example, within the metatarsophalangeal joint, the unique geometry of the metatarsal head has not been considered in previous approaches. For example, the curvature of the metatarsal head has two distinct curvatures in the medial lateral (ML) and the dorsal plantar (DP) directions. An implant may be configured such that the DP curvature may have a much tighter (smaller) radius than that in the ML plane. For example, the ratio of the DP curvature to the MP curvature may be 1.0:1.0, 1.0:1.1, 1.0:1.2, 1.0:1.3, 1.0:1.4, 1.0:1.5, 1.0:1.6, 1.0:1.7, 1.0:1.8, 1.0:1.9, or 1.0:2.0. Moreover, an implant may be configured such that articulation of the implant with a corresponding articular surface occurs on the dorsal half of the metatarsal head. An implant that fails to provide these curvatures may be prone to higher local contact stresses and result in damage to the opposing and surrounding cartilage.

Furthermore, the articulating surface of an implant may comprise a lubricious bearing material configured to provide more even applied stress compared to traditional hard materials such as ultra-high-molecular-weight-polyethylene, titanium, Ti6Al4V, and cobalt chromium. In some embodiments, the lubricious bearing material is configured to provide reduced contact pressures compared to traditional hard materials such as ultra high molecular weight polyethylene and cobalt chromium.

In some embodiments, the bearing surface is a lubricious surface. In some embodiments, the lubricious surface has a coefficient of friction of less than about 0.1. In some embodiments, the bearing surface has a coefficient of friction of less than about 0.05. In some embodiments, the lubricious surface has a coefficient of friction of less than about 0.010. In some embodiments, the lubricious surface has a coefficient of friction of less than about 0.005. In some embodiments, the lubricious surface has a coefficient of friction of less than about 0.003. In some embodiments, the lubricious surface has a coefficient of friction of less than about 0.001. In some embodiments, the lubricious surface has a coefficient of friction of about 0.001 to about 0.1.

Systems, methods, and devices described herein provide implants configured with unique placement within the metatarsal bone. Previous approaches to metatarsophalangeal joint hemiarthroplasty include resecting the distal portion of the metatarsal head in a plane roughly perpendicular to the metatarsal axis. This approach may result in several issues. For example, the sesamoid compartment may be violated and therefore changes the articulation of the sesamoids with the metatarsal and affects the kinematics of the joint during deep flexion during gait. Furthermore, resecting the distal portion of the metatarsal head may force replacement of the entire metatarsal head, despite most metatarsophalangeal cartilage lesions are on the dorsal half of the joint. Finally, this approach does not account for natural anatomic variation of the distal metatarsal articulation angle (DMAA) that can present with the articular surface angled relative to the metatarsal axis.

Systems, methods, and devices described herein provide implants configured to preserve native bone and target the actual location of cartilage damage and wear. For example, implants may be oriented so as to incline the implant in a dorsal manner with respect to the metatarsal axis while only removing the necessary bone by utilizing an inlay technique. This may provide an implant configured to replace the necessary amount of cartilage and/or bone, to relieve pain, and restore mobility of the joint. In some embodiments, implants described herein are configured to replace both articulating surfaces of a joint such that a first implant articulates against at least a portion of a second implant.

FIG. 1A illustrates an example of a metatarsophalangeal joint implant 102, according to an embodiment described herein. In some embodiments, the implant 102 is configured to be placed in a metacarpophalangeal joint. In some embodiments, the implant 102 has a post portion 104 extending from a head portion 106. In some embodiments, the head portion 106 comprises a plurality of layers. In some embodiments, the head portion 106 has a first layer 108 extending from a first surface 110 to a second layer 112. In some embodiments, the second layer 112 is at least partially disposed between first layer 108 and a third layer 114. In some embodiments, the third layer 114 is at least partially disposed between the second layer 112 and a head platform 116. In some embodiments, the head platform 116 extends at least partially from the third layer 114 and to a second surface 118. In some embodiments, the post portion 104 extends from the second surface 118 of the head platform 116.

Various materials may be used to construct each of the layers of implant 102. Suitable materials may include polymers, ceramics, metals, synthetic bone, regenerated tissue, and other suitable materials. Suitable materials for the first layer 108 in particular may include materials having lubricious properties. For example, first layer 108 may be constructed from a material that provides a lubricious and compliant first surface 110 and a non-lubricious surface undersurface which interfaces with the second layer 112.

In some embodiments, at least one of the layers, such as the first layer 108, comprises a biphasic polymer including a polymer and water. For example, the biphasic polymer may have a water composition of at least 10%, at least 20%, at least 30%, at least 40%, at least 50%, or at least 60%. The biphasic polymer may have a water composition that is distributed consistently throughout the first layer 108, or the water may be distributed in a gradient extending within the first layer 108, for example from one surface to an opposite surface, or extending only partially through the first layer 108. The water composition gradient is configured so that the composition of water changes along the thickness of the layer, from the first surface 110 at one end to its internal under surface, with a bulk region in between, so as to provide a proper connection to the hydrophobic second layer 112 and the hydrophilic articulating first surface 110. More particularly, the gradient includes a first water composition at the compliant surface, a second water composition at the under surface, and a bulk water composition extending between those two surfaces. In some implementations, for example those useful for repairing diarthrodial joints, the water is distributed in the first layer 108 so the water composition is highest at the compliant surface and lowest at the under surface of first layer 108 (e.g., at or near 0), to provide an essentially hydrophobic, non-lubricious interface with the second layer 112 of the construct, with the bulk water being distributed at a composition in between the respective water compositions of the two surfaces. That arrangement provides a lubricious interface for joint articulation, on one side, and a hydrophobic, non-lubricious connection surface to the second layer 112 on the other side of the first layer 108. The water composition at the compliant surface can be adjusted as needed in combination with adjustment of the rest of the gradient. For example, the water gradient may extend between the first surface 110 and the under surface of first layer 108 which interfaces with the second layer 112. The water gradient may range from less than 1% at one part in the biphasic polymer to at least 20%, or at least 30%, or at least 40% at another part in the biphasic polymer, for example the gradient may have a water composition of less than 1% at a hydrophobic side (e.g., at under surface of the first layer 108 which, in a corresponding implant, may be at a position just proximal of the interface with the second layer 112), and at least 20%, at least 30%, at least 40%, or at least 50% at an opposite, more hydrophilic side (e.g., at first surface 110, which in the complementary surface of a corresponding implant is the articulating surface of the first layer 108). In some implementations, the water composition at the compliant surface is at least 25%, and may be higher (e.g., 40-50%, e.g., 40%, 45% or 50%, or even 60% to 80%), providing the lubricious quality; while the water composition at the under surface is low (e.g., less than 10%, less than 5%, or less than 1% (or even approach 0 or is 0)), providing the non-lubricious quality. In the bulk region, the bulk water composition is distributed at an operating condition that provides an optimal aqueous balance and transition between the hydrophilic first surface 110 and the hydrophobic under surface of the first layer 108. In implementations, the bulk water composition is in the 25%-41% range (e.g., 27-34%) and may be distributed as a gradient between that range, so as to provide a smooth transition between the compliant first surface 110 and the under surface, or may be distributed at a generally constant level between the two surfaces, for example at a point within the range (e.g., 27%, or 34%).

The biphasic polymer may be a water-swellable interpenetrating polymer network (IPN) or semi-IPN that comprises a first polymeric network comprising the thermoplastic polymer and a second polymeric network comprising a polymer having carboxylic acid groups or derivatives thereof, wherein the IPN or semi-IPN has a concentration of the carboxylic acid groups or derivatives thereof that is at maximum at the first surface 110 and decreases to zero or substantially zero within a bulk of the IPN or semi-IPN. The carboxylic acid groups or derivatives thereof may include underivatized carboxylic acid groups, sulfonic-acid-derivatized carboxylic acid groups, or a mixture thereof. For example, the polymer having carboxylic acid groups or derivatives thereof is formed from one or more monomers selected from acrylic acid, methacrylic acid, crotonic acid, linolenic acid, maleic acid, fumaric acid, and derivatives thereof. The carboxylic acid groups may be completely underivatized or may include sulfonic acid derivatized carboxylic acid groups (a mixture of underivatized and derivatized groups, or the groups are completely derivatized). The sulfonic-acid derivatized carboxylic acid groups may be taurine-derivatized carboxylic acid groups. In some implementations, the thermoplastic polymer is not water-based but functionally conformable to the joint geometry and sufficiently biocompatible so as to be used instead of biphasic polymer, for example polyurethane, e.g., polyether urethane or other forms of polyurethane, in the first layer 108 of a construct.

In some embodiments, the first layer 108 comprises a lubricious material. In some embodiments, the first layer 108 comprises a material selected from a group consisting of lubricious material, titanium, cobalt-chromium, or ultra-high molecular weight polyethylene. In some embodiments, the first layer 108 comprises a first material and a second material. In some embodiments, the first material comprises a lubricious material and the second material comprises a material selected from a group consisting of titanium, cobalt-chromium, or ultra-high molecular weight polyethylene. In some embodiments, the first material transitions to the second material. For example, the first layer 108 may be configured with the second material to provide additional mechanical strength in areas articulating with bone.

In some embodiments, a layer, such as the second layer 112, comprises urethane or a urethane-based material. In some implementations, the urethane-based material is a copolymer of urethane dimethacrylate monomer comprising a hard segment and a soft segment, and methyl methacrylate monomer. For example, second layer 112 may be formed from a copolymer of about 60% (w/w) to about 99% (w/w) (e.g., about 60% (w/w) to about 80% (w/w)) urethane dimethacrylate monomer, and about 1% (w/w) to about 40% (w/w) (20% (w/w) to about 40% (w/w)) methyl methacrylate monomer. In some implementations, the hard segment of the urethane dimethacrylate of the first polymeric adhesive is formed from one or more of 1,5-naphthalene diisocyanate (NDI), 2,6 toluene diisocyanate or 2,4 toluene diisocyanate (TDI), 3,3-bitoluene diisocyanate (TODI), cyclohexyl diisocyanate (CHDI), hexamethyl diisocyanate (HDI), isophorone diisocyanate (IPDI), methylene bis(p-phenyl) isocyanate, methylene diphenylisocyanate (MDI), and methylene bis(p-cyclohexyl isocyanate) (HMDI). In some implementations, the soft segment of the urethane dimethacrylate monomer is formed from one or more of polybutadiene, polyethylene oxide (PEO), hydroxy terminated butadiene, hydroxybutyl-terminated polydimethylsiloxane (PDMS), hydroxyl terminated polyisobutylene, poly (1,6-hexyl-1,2-ethyl carbonate), polycaprolactone, polycarbonate, polyethylene adipate, polyhexamethylene carbonate glycol, polypropylene oxide (PPO), polytetramethylene adipate, poly(dimethylsiloxane), and poly(tetramethylene oxide) (PTMO). For example, the hard segment of the urethane dimethacrylate monomer may be formed from MDI and the soft segment of the urethane dimethacrylate may be formed from PTMO. In some implementations, the soft segment of the urethane dimethacrylate of the polymeric adhesive layer may be formed from a mixture of PTMO having different molecular weights, e.g., molecular weights ranging from about 500 Da to about 1250 Da.

In some embodiments, a layer of implant 102, such as third layer 114 or head platform 116, comprises a metal (e.g., titanium, tantalum, stainless steel, cobalt chrome, nickel-titanium, zirconium, or alloys thereof), a polymer (e.g., PEEK, PE, PS, or PP), a ceramic, bone, or synthetic bone. In some embodiments, the second surface 118 of the head platform 116 is configured to at least partially couple with a bone via mechanical or physical means immediately upon implantation. In some embodiments, the head platform 116 and/or the post portion 104 are affixed to bone using bone cement. In some embodiments, the head platform 116 and/or the post portion 104 are at least partially porous such that bone is able to at least partially grow into the head platform 116 and/or the post portion 104. In some embodiments, the head platform 116 and/or post portion 104 is coated with a material to promote bone integration upon implantation in the body. In some embodiments, an outer post surface 120 is porous. For example, the second outer post surface 120 may have pores that are an appropriate size to promote the growth of bone cells on the outer post surface 120. In some embodiments, the entire post portion 104 is porous. In some embodiments, both the head portion 106 and the post portion 104 are entirely porous. In some embodiments, the implant 102 comprises the head portion 106 with no post portion 104.

Figure 1B:
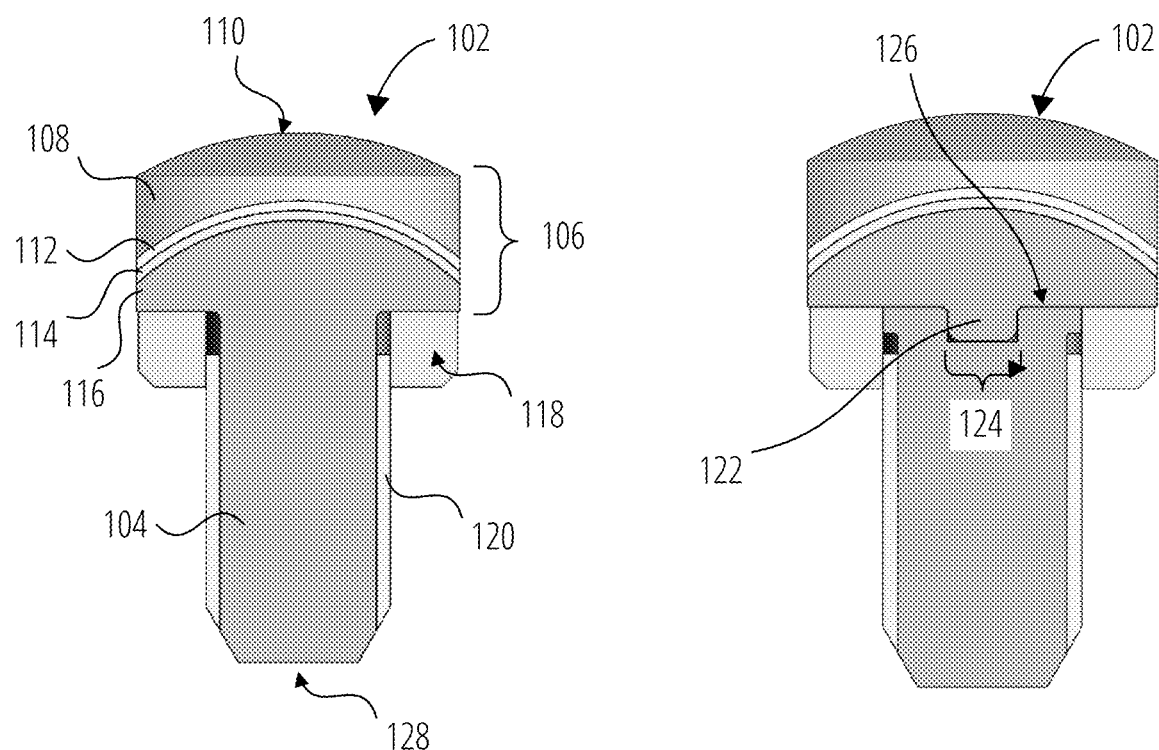
FIG. 1B illustrates a cross-sectional view of the implant in FIG. 1A, according to an embodiment described herein.

FIG. 1B illustrates a cross-sectional view of the implant 102 in FIG. 1A, according to embodiments described herein. In some embodiments, the head platform 116 is fixedly coupled with the post portion 104 in some embodiments, the head platform 116 is detachably coupled with the post portion 104. For example, the post portion 104 may be a separate part from the post portion 104. In some embodiments, the head portion 106 has a protrusion 122 extending from the second surface 118 towards the post portion 104 along the longitudinal axis of the implant 102. In some embodiments, the post portion 104 has a recess 124 at least partially disposed into the head facing surface 126 of the post portion 104. In some embodiments, the recess 124 is on the opposite side of the post portion 104 as the bone facing surface 128. In some embodiments, the recess 124 is configured to fixedly couple with the protrusion 122 so as to attach the head portion 106 with the post portion 104. In some embodiments, the recess 124 is configured to detachably couple with the protrusion 122 of the head portion 106.

In some embodiments, the first surface 110 of the head portion 106 is convex. In some embodiments, the first surface 110 has a single substantially spherical convex curvature. In some embodiments, the first surface 110 of the head portion 106 is concave. In some embodiments, the first surface 110 has a single substantially spherical concave curvature.

In some embodiments, the diameter of the head portion 106 is selected so as to fit the existing bone in the joint. For example, within a metatarsophalangeal joint the diameter of head portion 106 may be selected so as to fit within the existing bone stock on the dorsal metatarsal head. As a further example, within a metacarpophalangeal joint the diameter of head portion 106 may be selected so as to fit within the existing bone stock on the dorsal metacarpal head. In some embodiments, the diameter of the head portion 106 is be between 4 mm to 5 mm, between 5 mm to 6 mm, between 6 mm to 7 mm, between 7 mm to 8 mm, between 8 mm to 9 mm, between 9 mm to 10 mm, between 10 mm to 11 mm, between 11 mm to 12 mm, between 12 mm to 13 mm, between 13 mm to 14 mm, between 14 mm to 15 mm, between 15 mm to 16 mm, between 16 mm to 17 mm, between 17 mm to 18 mm, between 18 mm to 19 mm, between 19 mm to 20 mm, between 20 mm to 21 mm, between 21 mm to 22 mm, between 22 mm to 23 mm, between 23 mm to 24 mm, between 24 mm to 25 mm, or any combination therein. In some embodiments, the diameter of the head portion 106 is greater than 4 mm. In some embodiments, the diameter of the head portion 106 is less than 25 mm. In some embodiments, the diameter of head portion 106 may be selected to replace the maximal amount of dorsal cartilage without interfering with the sesamoid grooves.

The curvature of the first surface 110 may provide a desired contact pressure to a corresponding implant or bone within a joint. In some embodiments, the desired pressure is about the pressure exerted by a native healthy joint. In some embodiments, first surface 110 is completely disposed by a corresponding implant or bone within a joint. In some embodiments, first surface 110 is partially disposed by a corresponding implant or bone within a joint.

In some embodiments, the second surface 118 is concave. In some embodiments, each of the first layer 108, the second layer 112, the third layer 114, and the head platform 116, have a convex surface facing the first surface 110 and a concave surface facing the second surface 118. In some embodiments, the convex and concave curvatures of each of the first layer 108, the second layer 112, the third layer 114, and the head platform 116 are the same so as to allow the first layer 108, the second layer 112, the third layer 114, and the head platform 116 to fit within each other. In some embodiments, at least one of the first layer 108, second layer 112, third layer 114, and the head platform 116 has a surface facing the second surface 118 which is flat or closer to a 180 degree curvature relative to the surface of the same layer facing the first surface 110.

In some embodiments, the second surface 118 is shaped to minimize bone removal. In some embodiments, a pocket or void is at least partially disposed within the second surface 118 to allow for additional bone to be preserved. In some embodiments, the curvature of the second surface 118 is fully spherical, a portion of a sphere, or a portion of an ellipsoid. In some embodiments, the second surface 118 is substantially flat. In some embodiments, the curvature of the second surface 118 is a section of a cone or of a cylinder. In some embodiments, the curvature of the second surface 118 is configured to provide less bone removal than a linear resection. In some embodiments, the curvature of the second surface 118 is configured to provide better stability from lateral and bending loads. In some embodiments, the curvature of the second surface 118 provides superior strength over flat curvatures.

Figure 2A:
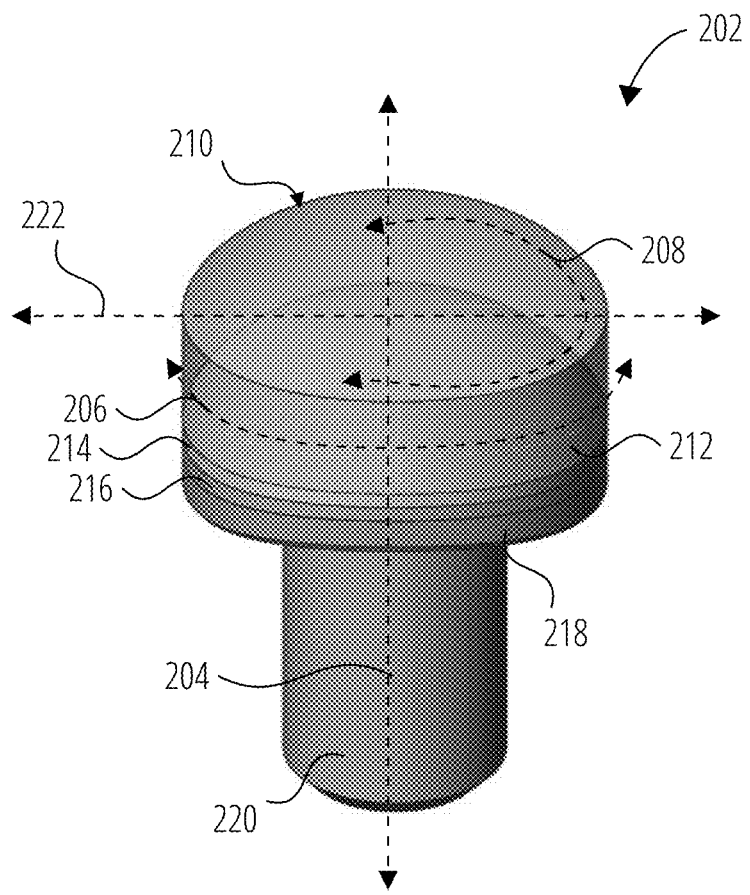
FIG. 2A illustrates an exemplary embodiment of an implant viewed from a first axis and having a first curvature and a second curvature, according to an embodiment described herein.

FIG. 2A illustrates an exemplary embodiment of an implant 202 viewed from a first axis 204 and having a first curvature 206 and a second curvature 208, according to an embodiment described herein.

In some embodiments, the first surface 210 comprises a plurality of curvatures. For example, the first surface 210 may have a first curvature 206 and a second curvature 208. In some embodiments, the first curvature 206 curves with the plateau of the curvature located at the first axis 204. In some embodiments, each of the first layer 212, the second layer 214, the third layer 216, and the head platform 218 have the same curvature as the first surface 210 for each surface facing the first surface 210. In some embodiments, at least one of the first layer 212, the second layer 214, the third layer 216, and the head platform 218 have the same curvature as the first surface 210 for each surface facing the first surface 210. In some embodiments, at least one of the first layer 212, the second layer 214, the third layer 216, and the head platform 218 have the same curvature as the first surface 210 for each surface facing the first surface 210 and the surface facing the post portion 220.

Figure 2B:
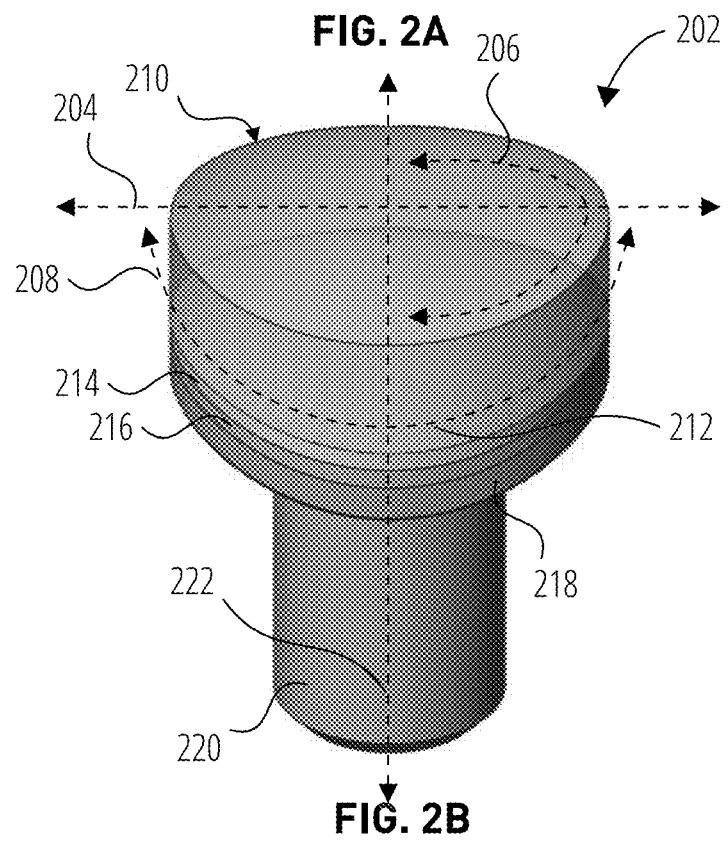
FIG. 2B illustrates an exemplary embodiment of an implant of FIG. 2A viewed from a second axis and having a first curvature and a second curvature, according to an embodiment described herein.

FIG. 2B illustrates an exemplary embodiment of an implant 202 of FIG. 2A viewed from a second axis 222 and having a first curvature 206 and a second curvature 208, according to an embodiment described herein.

In some embodiments, the first curvature 206 curves with the plateau of the curvature located at a second axis 222. The first curvature 206 may be oriented in line with the first axis 204 which may be the distal-plantar axis of the joint and the second curvature 208 may be aligned with the second axis 222 which may be the medial-lateral axis of the joint. In some embodiments, the second curvature 208 has a more acute angle of curvature than the first curvature 206. In some embodiments, the second curvature 208 has a less acute angle of curvature than the first curvature 206. In some embodiments, the first curve and the second curve are configured to scale with the diameter of the post portion 220. For example, the ratio of the first curvature 206 to the second curvature 208 curvature may be 1.0:1.0, 1.0:1.1, 1.0:1.2, 1.0:1.3, 1.0:1.4, 1.0:1.5, 1.0:1.6, 1.0; 1.7, 1.0:1.8, 1.0:1.9, or 1.0:2.0. In some embodiments, the ratio of the first curvature 206 to the second curvature 208 is less than 1:8.

In some embodiments, at least one of the first curvature 206 and the second curvature 208 are between 6 mm and 8 mm, between 8 mm and 10 mm, between 10 mm and 12 mm, between 12 mm and 14 mm, between 14 mm and 16 mm, between 16 mm and 18 mm, between 18 mm and 20 mm, or any combination therein.

Figure 3:
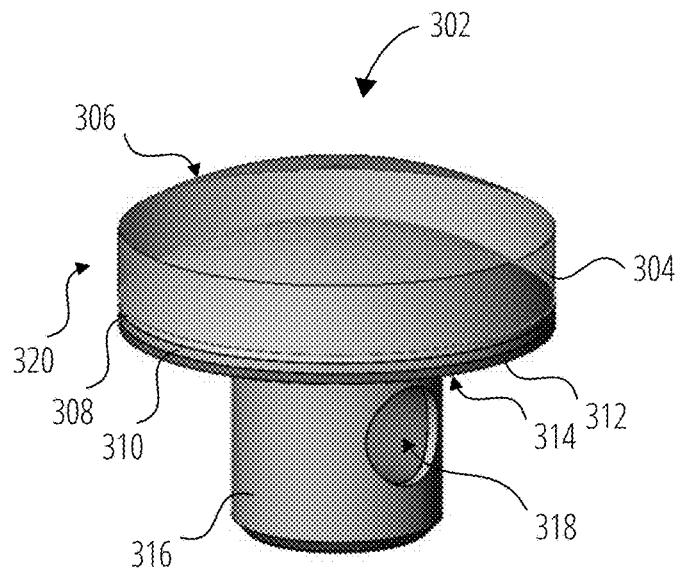
FIG. 3 illustrates an example of an isometric view of an implant having transverse lumens, according to an embodiment described herein.

FIG. 3 illustrates an example of an implant 302, according to an embodiment described herein. In some embodiments, the implant 302 has a first layer 304 extending from a first surface 306 to a second layer 308. In some embodiments, the second layer 308 extends to a third layer 310. In some embodiments, the third layer 310 extends to a head platform 312. In some embodiments, the head platform 312 is connected to a second surface 314. In some embodiments, the second surface 314 is attached to a post portion 316 that extends along the longitudinal axis of the implant 302.

In some embodiments, the post portion 316 has a first lumen 318 at least partially disposed through the length of the post portion 316. In some embodiments, the first lumen 318 allows for secondary fixation via insertion of pins, wires, or screws. In some embodiments, the first lumen 318 is circular in cross section. In some embodiments, the first lumen 318 has a smooth bore. In some embodiments, the first lumen 318 is threaded. In some embodiments, the first lumen 318 extends completely through the post portion 316. In some embodiments, the first lumen 318 extends only partially through the post portion 316.

In some embodiments, the first lumen 318 extends through the post portion 316 perpendicular to the longitudinal axis of the post portion 316. In some embodiments, the first lumen 318 extends through the post portion 316 at an angle between 0 degrees to 5 degrees, between 5 degrees to 10 degrees, between 10 degrees to 15 degrees, between 15 degrees to 20 degrees, between 20 degrees to 25 degrees, between 25 degrees to 30 degrees, or any combination therein.

In some embodiments, the post portion 316 has a circular cross section. In some embodiments, the length of the post portion 316 is between 6 mm to 8 mm, between 8 mm to 10 mm, between 10 mm to 12 mm, between 12 mm to 14 mm, between 14 mm to 16 mm, between 16 mm to 18 mm, between 18 mm to 20 mm, or any combination therein.

In some embodiments, the head platform 312 and/or the post portion 316 are at least partially porous such that bone is able to at least partially grow into the head platform 312 and/or the post portion 316. In some embodiments, the head platform 116 and/or post portion 104 is coated with a material to promote bone integration upon implantation in the body. In some embodiments, an outer post surface 120 is porous. For example, the second outer post surface 120 may have pores that are an appropriate size to promote the growth of bone cells on the outer post surface 120. In some embodiments, the outer post surface 120 is plasma sprayed. In some embodiments, the outer post surface 120 is grit blast. In some embodiments, the outer post surface 120 is configured to facilitate bone attachment. In some embodiments, the entire post portion 104 is porous. In some embodiments, both the head portion 106 and the post portion 104 are entirely porous. In some embodiments, the average pore diameter of the porous areas is at least twice as small than the diameter of first lumen 318. In some embodiments, the average pore diameter of the porous areas is at least three times smaller than the diameter of first lumen 318. In some embodiments, the average pore diameter of the porous areas is at least five times smaller than the diameter of first lumen 318. In some embodiments, the average pore diameter of the porous areas is at least ten times smaller than the diameter of the first lumen 318. In some embodiments, the average pore diameter of the porous areas is at least fifteen times smaller than the diameter of the first lumen 318. In some embodiments, the average pore diameter of the porous areas is at least fifty times smaller than the diameter of the first lumen 318.

Figure 4:
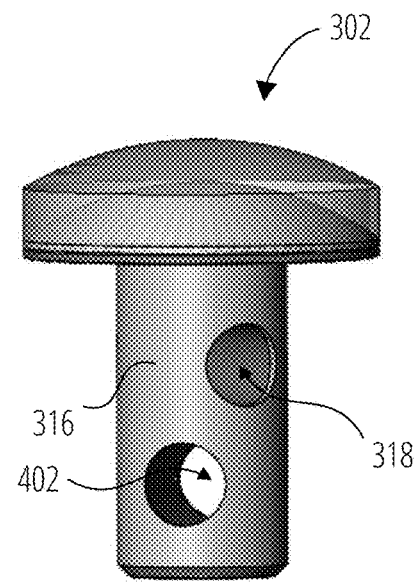
FIG. 4 illustrates an example of a planar view of an implant according to an embodiment described herein.

FIG. 4 illustrates an example of a transverse view of the implant 302 of FIG. 3, according to an embodiment described herein. In some embodiments, an implant 302 has a post portion 316, a first lumen 318, and a second lumen 402. In some embodiments, at least one of the first lumen 318 and the second lumen 402 is configured to provide additional options and/or stability for affixing the implant 302 to a bone. In some embodiments, the first lumen 318 and the second lumen 402 extend through the post portion 316 perpendicular to one another. In some embodiments, the first lumen 318 and the second lumen 402 extend through the post portion 316 parallel to one another. In some embodiments, the first lumen 318 and the second lumen 402 extend through the post portion 316 at an acute angle relative to one another. In some embodiments, at least one of the first lumen 318 and the second lumen 402 are circular in cross section. In some embodiments, the diameters of the first lumen 318 and the second lumen 402 are the same. In some embodiments, the diameter of the first lumen 318 is larger than the diameter of the second lumen 402. In some embodiments, the diameter of the second lumen 402 is larger than the diameter of first lumen 318. In some embodiments, the diameters of the first lumen 318 and the second lumen 402 are between 1 mm to 2 mm, 2 mm to 3 mm, 3 mm to 4 mm, 4 mm to 5 mm, or any combination therein.

Figure 5:
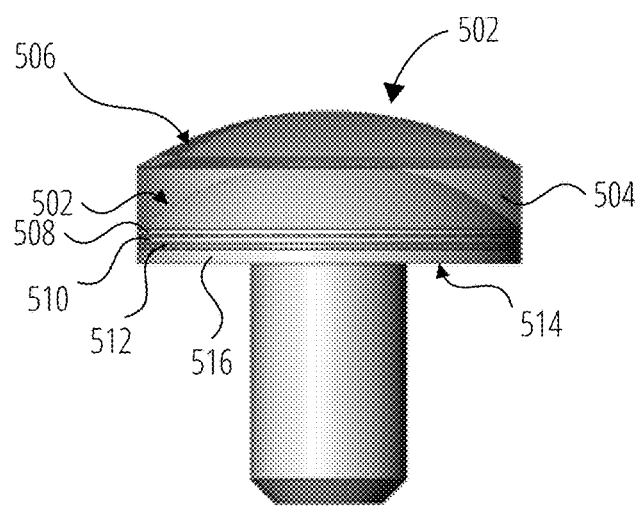
FIG. 5 illustrates an example of an implant, according to an embodiment described herein.

FIG. 5 illustrates an example of an implant 502, according to an embodiment described herein. In some embodiments, the implant 502 has a first layer 504 extending from a first surface 506 to a second layer 508. In some embodiments, the second layer 508 extends to a third layer 510. In some embodiments, the third layer 510 extends to a head platform 512. In some embodiments, the head platform 512 is connected to a second surface 514. In some embodiments, the curvature of the second surface 514 is substantially flat. In some embodiments, the second layer 508, the third layer 510, and the head platform 512 have a substantially flat surface facing the post and facing the first layer. In some embodiments, the first surface 506 is convex having a substantially spherical curvature.

In some embodiments, a fourth layer 516 extends from the head platform 512 to the second surface 514. In some embodiments, the fourth layer extends from the third layer 510 to the head platform 512. In some embodiments, the fourth layer 516 is a coating or is coated with a material to promote bone integration upon implantation in the body. For example, the fourth layer 516 may have pores that are an appropriate size to promote the growth of bone cells on the outer post surface 120.

Figure 6A:
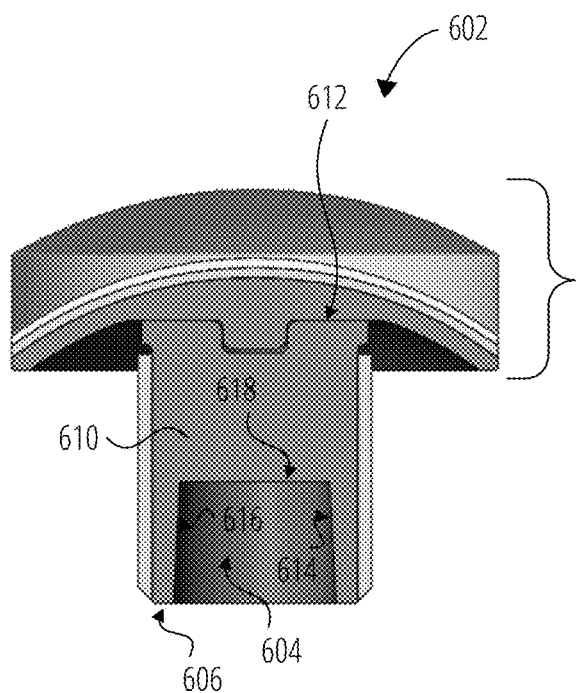
FIG. 6A illustrates a cross sectional view of an implant with a recess extending through a bone facing surface, according to an embodiment described herein.

FIG. 6A illustrates a cross-sectional view of an implant 602 with a recess 604 extending through a bone facing surface 606, according to an embodiment described herein. In some embodiments, the implant 602 comprises a head portion 608 fixedly coupled with a post 610. In some embodiments, the head portion 608 is detachably coupled with the post 610. In some embodiments, the post 610 extends between a head facing surface 612 and a bone facing surface 606.

In some embodiments, the bone facing surface 606 includes the recess 604 extending at least partially through the bone facing surface 606 along the longitudinal axis of the post 610. In some embodiments, the recess 604 is substantially cylindrical in shape. In some embodiments, the 604 is substantially rectangular in shape. In some embodiments, the recess 604 is comprised of a first lateral wall 614, a second lateral wall 616, and an inner recess surface 618. In some embodiments, at least one of the first lateral wall 614 and the second lateral wall 616 are straight. In some embodiments, the first lateral wall 614 and the second lateral wall 616 form one continuous cylindrical wall. In some embodiments, at least one of the first lateral wall 614 and the second lateral wall 616 are tapered outward towards the bone facing surface 606. In some embodiments, the recess 604 is configured to attach to an augment in a bone. For example, the recess 604 and the first lateral wall 614 and the second lateral wall 616 may be used to create a press fit with an augment in a bone to attach the implant 602 to the bone.

In some embodiments, the recess 604 is configured to provide additional mechanical strength for coupling the implant 402 with a bone. For example, the recess 604 may be used in cases where the bone is lower quality and/or has structural defects. In some embodiments, the recess 604 is configured to be a mechanism to allow rigid locking between the implant 602 and an extension to the post 610. For example, the recess 604 may be a j-slot, a t-slot, a taper, or other mechanism configured to provide a rigid locking between the implant 602 and an extension to the post 610. In some embodiments, the recess 604 is a blind hole. In some embodiments, the recess 604 is a through hole. In some embodiments, the ability to add an extension to the post 610 provides more revision options for the implant 602.

Figure 6B:
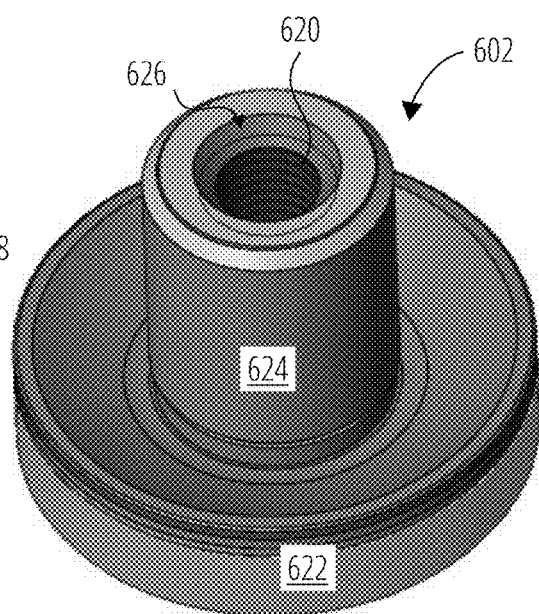
FIG. 6B illustrates an example of an implant with a threaded recess, according to an embodiment described herein.

FIG. 6B illustrates an example of an implant 602 with a threaded recess 620, according to an embodiment described herein. In some embodiments, the implant 602 has a head portion 622 fixedly coupled to a post 624. In some embodiments, the head portion 622 is detachably coupled to the post 624. In some embodiments, the post 624 has the threaded recess 620 extending through the longitudinal axis of the post 624. In some embodiments, the threaded recess 620 has a tapered section 626 along the bone facing surface of the post 624. In some embodiments, the threaded recess 620 extends only partially through the post 624. In some embodiments, the threaded recess 620 extends entirely through the post 624 and the head portion 622. In some embodiments, the threaded recess 620 is configured to be screwed onto an augment in a bone.

Figure 7:
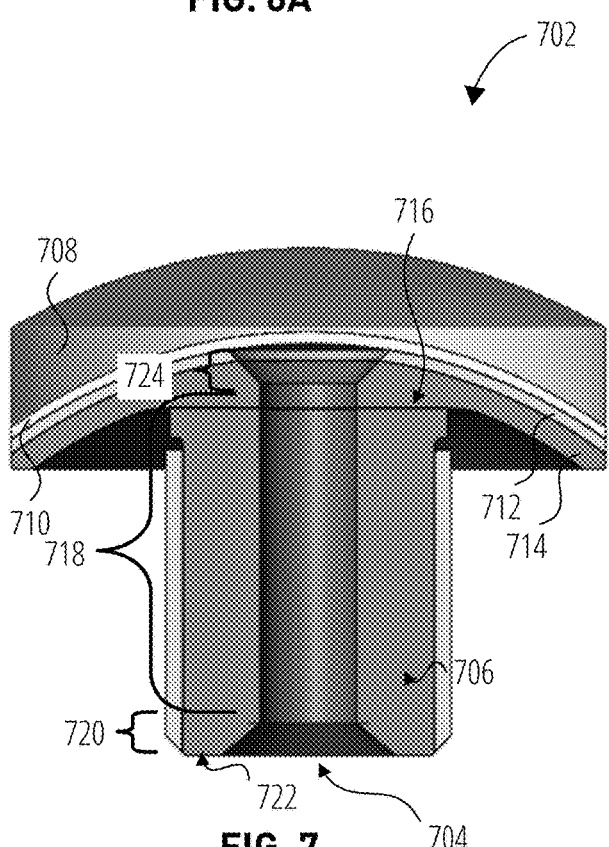
FIG. 7 illustrates an example of an implant that includes a recess extending through a post, according to an embodiment described herein.

FIG. 7 illustrates an example of an implant 702 that includes a recess 704 extending through a post 706, according to an embodiment described herein. In some embodiments, the implant 702 has a first layer 708 that extends to a second layer 710. In some embodiments, the second layer 710 extends to a third layer 712. In some embodiments, the third layer 712 extends to a head platform 714. In some embodiments, the head platform 714 is fixedly coupled to a post 706. In some embodiments, the head platform 714 is detachably coupled to the post 706 along a head facing surface 716. In some embodiments, the post 706 has a longitudinal lumen 718 extending through the post 706 and the head platform 714. In some embodiments, the longitudinal lumen 718 extends through the third layer 712. In some embodiments, the longitudinal lumen 718 extends through the second layer 710. In some embodiments, the longitudinal lumen 718 extends through the first layer 708.

In some embodiments, the longitudinal lumen 718 has a first tapered section 720 that extends from a bone facing surface 722 and a second tapered section 724 that extends from the opposite end. In some embodiments, the first tapered section 720 is configured to provide space for an extraction instrument to exert axial force on the implant 702. For example, the first tapered section 720 may be threaded, a t-slot, a j-slot, or other mechanism to exert axial force on the implant 702. In some embodiments, the second tapered section 724 is configured to provide space for a cap or covering over the longitudinal lumen 718. For example, the second tapered section 724 may be covered with a polymeric or metal cap configured to prevent bone or HBC ingress, providing a clean surface in the longitudinal lumen 718 for later attachment of an augment or extractor. In some embodiments, the second tapered section 724 is configured to facilitate the necessary removal of material covering the second tapered section 724. For example, the material covering the second tapered section 724 may be removed via drilling, coring, or other methods of removal to provide access to the longitudinal lumen 718.

Figure 8:
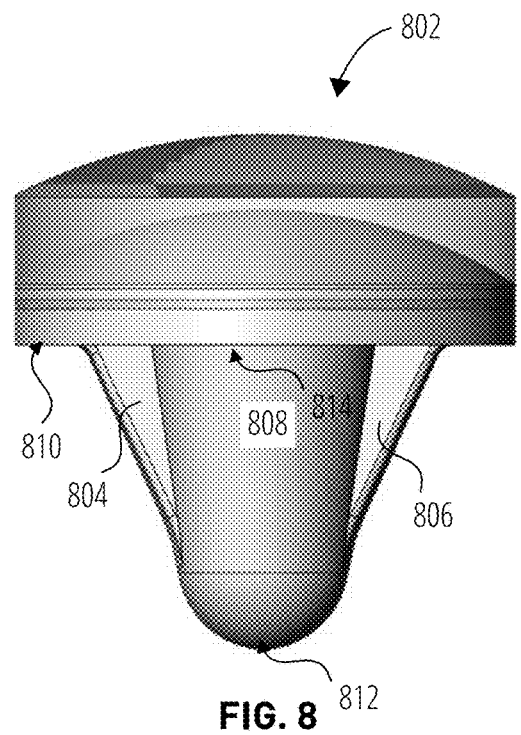
FIG. 8 illustrates an example of an implant having one or more fins, according to an embodiment described herein.

FIG. 8 illustrates an example of an implant 802 having one or more fins, according to an embodiment described herein. In some embodiments, the implant 802 has a first fin 804 and a second fin 806 attached to a post 808. In some embodiments, at least one of the first fin 804 and the second fin 806 are attached to a head platform 810. In some embodiments, the post 808 is made from a material suitable for implantation into the body. For example, the post 808 may be made of metals such as titanium and its alloys, cobalt-chromium and its alloys, stainless steel or its alloys or the post 808 may be made from rigid plastics such as poly-ether-ether-ketone or may be made from other suitable materials such as ceramics or allograft bone. In some embodiments, the post 808 is straight. In some embodiments, the post 808 is tapered. In some embodiments, the post 808 has fins or barbs to facilitate fixation.

In some embodiments, at least one of the first fin 804 and the second fin 806 is a shape memory metal. In some embodiments, the shape memory metal is nitinol. In some embodiments, the shape memory metal is configured to permit at least one of the first fin 804 and the second fin 806 to expand from a collapsed configuration to an expanded configuration. For example, at least one of the first fin 804 and the second fin 806 may transition from the collapsed configuration to the expanded configuration upon reaching body temperature. In another non-limiting example, at least one of the first fin 804 and the second fin 806 may transition from the collapsed configuration to the expanded configuration when pressure is applied to the implant 802. In another non-limiting example, at least one of the first fin 804 and the second fin 806 may be spring-loaded to transition from the collapsed configuration to the expanded configuration when the implant 802 is inserted into place. In another non-limiting example, at least one of the first fin 804 and the second fin 806 may be extended when a central screw is inserted through post 808.

In some embodiments, the first fin 804 and the second fin 806 may be deformable after insertion to prevent extraction. In some embodiments, the first fin 804 and the second fin 806 may provide alignment of the implant 802 with the articular surface to ensure proper matching of curvatures between the implant 802 and a bone. In some embodiments, the post 808 is terminated by a bone facing surface 812. In some embodiments, the bone facing surface 812 may be shaped to match with an insertion site within a bone. For example, the shape bone facing surface 812 may be fully spherical, a portion of a cone or cylinder, flat, or other matching curvature.

In some embodiments, the implant 802 may be inserted into place and cemented, press fit, and/or threaded to affix the implant 802 to the insertion site with a bone. In some embodiments, the post 808 may include a male thread. In some embodiments, a female thread may be placed on a head underside surface 814 where the implant 802 is around a bone. In some embodiments, both the post 808 and the head underside surface 814 include thread features.

Figure 9A:
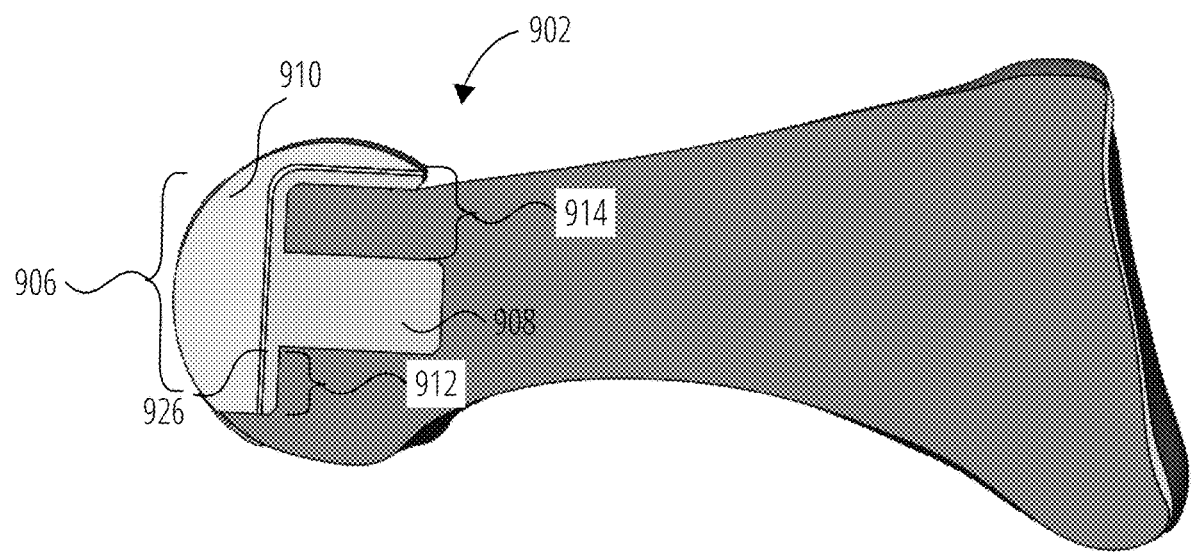
FIG. 9A illustrates an example of an implant with a foot portion extending from a head portion, according to an embodiment described herein.

FIG. 9A illustrates an example of an implant 902 with a foot portion 904 extending from a head portion 906, according to an embodiment described herein. In some embodiments, the implant 902 is comprised of a post 908 attached to the head portion 906. In some embodiments, the head portion 906 has a first layer 910 that extends a distance beyond the head portion 906 into at least one of a first foot portion 912 and a second foot portion 914, wherein there is a gap between at least one of the first foot portion 912 and the second foot portion 914 and the post 908. In some embodiments, at least one of the first foot portions 912 and the second foot portion 914 is a dorsal flange. In some embodiments, at least one of the first foot portion 912 and the second foot portion 914 is configured to increase the articulating surface of the implant 902.

Figure 9B:
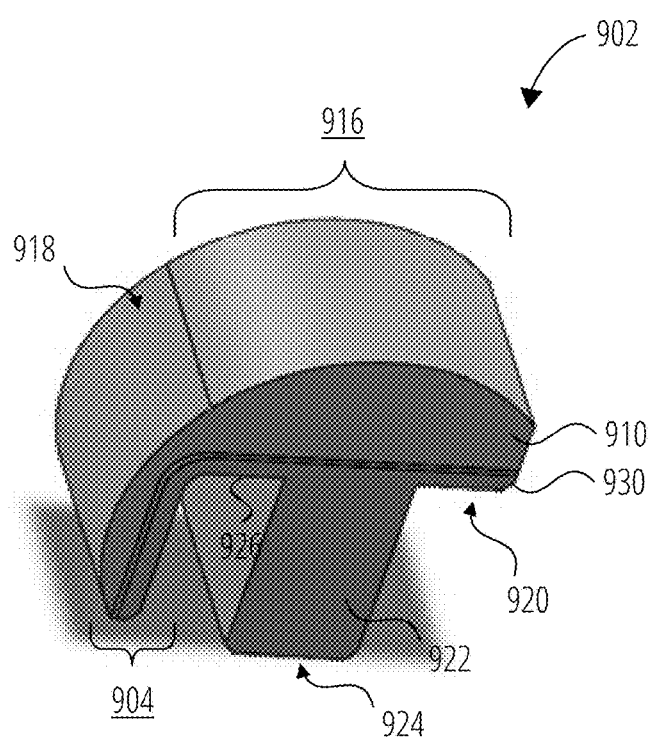
FIG. 9B illustrates an example of the implant from FIG. 9A having a single foot portion, according to an embodiment described herein.

FIG. 9B illustrates an example of the implant 902 from FIG. 9A having a single foot portion 904, according to an embodiment described herein. In some embodiments, the implant 902 has a head portion 916 extending from a first surface 918 to a second surface 920 and a post portion 922 extending away from the second surface 920 of the head portion 916.

In some embodiments, the implant 902 is configured such that the outer perimeter of the head portion 916 is equal to the perimeter of the post portion 922. In some embodiments, the outer perimeter of the head portion 916 is greater than the outer perimeter of the post portion 922.

In some embodiments, the foot portion 904 extends from the head portion 906 in a direction toward the bone facing surface 924. In some embodiments, the bone facing surface 924 is located distal to the distal tip of the foot portion 904. In some embodiments, the first surface 918 extends from the head portion 916 along the entire length of the foot portion 904. In some embodiments, the first layer 910 is lubricous. In some embodiments, the implant 902 is configured to be disposed at least partially in an articulating surface of a bone such that the first surface 918 of the foot portion 904 articulates with an articulating surface of a corresponding bone. For example, the foot portion 904 may provide an articulating surface for instances where the metatarsophalangeal joint is a position of flexion beyond a normal range of motion. As a further example, the foot portion 904 may provide an articulating surface for instances where the metacarpophalangeal joint is in a position of flexion beyond a normal range of motion.

In some embodiments, the implant 902 has a post portion 922 that is substantially rectangular in shape. In some embodiments, the post portion 922 may have a cross-sectional shape that is substantially circular, rectangular, pentagonal, heptagonal, sectional, or octagonal. In some embodiments, a recess is at least partially disposed into the bone facing surface 924 of the post portion 922 such as shown and described with respect to FIG. 6A-FIG. 7. In some embodiments, the post portion 922 comprises one of more fins such as shown and described with respect to FIG. 8. In some embodiments, the head portion 916 comprises a plurality of layers such as shown and described with respect to FIG. 1A-FIG. 5.

FIG. 10A illustrates an example of an implant 1002 inserted into a bone 1004, according to an embodiment described herein. In some embodiments, the bone 1004 is a metatarsal or a phalangeal bone. In some embodiments, the bone 1004 is a metacarpal bone. In some embodiments, the bone 1004 is a phalangeal bone. In some embodiments, the implant 1002 is implanted into a bone 1004 such that a first surface 1006 of the implant 1002 is flush with and surrounded by native cartilage. In some embodiments, the implant 1002 is configured to remove all of the articular cartilage instead of sitting within it. In some embodiments, the implant 1002 is placed along a dorsal angulation axis 1008. For example, the dorsal angulation axis 1008 may be between 0 degrees and 10 degrees, between 10 degrees to 15 degrees, between 15 degrees to 20 degrees, between 20 degrees to 25 degrees, between 25 degrees to 30 degrees, or any combination thereof with respect to a metatarsal axis 1010. In some embodiments, the dorsal angulation axis 1008 is at a 30-degree angle with respect to the metatarsal axis 1010. In some embodiments, the dorsal angulation axis 1008 is at a 15-degree angle with respect to the metatarsal axis 1010. In some embodiments, the implant 1002 is configured to by positioned to account for variation in a distal metatarsal articular angle axis 1012 by allowing for medial/lateral placement to center the implant 1002 on the bone 1004. In some embodiments, the implant 1002 is configured to be adjustable in the location and angle of insertion such as to allow for offset or oblique positioning to correct deformities.

In some embodiments, a recess is at least partially disposed into the bone facing surface of the post portion such as shown and described with respect to FIG. 6A-FIG. 7. In some embodiments, the post portion comprises one of more fins such as shown and described with respect to FIG. 8. In some embodiments, the head portion comprises a plurality of layers such as shown and described with respect to FIG. 1A-FIG. 5.

FIG. 10B illustrates an example of a joint-facing, top-down view of an implant 1002 inserted into a bone 1004 along a dorsal angulation axis 1008. In some embodiments, the implant 1002 is inlayed into the bone such that a first surface 1006 is flush with the surrounding cartilage. In some embodiments, the implant 1002 is proud from the cartilage surface by about 1 mm. In some embodiments, the implant 1002 is recessed into the cartilage surface by about 1 mm.

FIG. 10C illustrates an example of the implant 1002 of FIG. 10A and FIG. 10B from another perspective, wherein the implant 1002 inserted into a bone 1004. In some embodiments, the bone is a metatarsal bone. In some embodiments, the bone 1004 is metacarpal bone. In some embodiments, the bone 1004 is a phalangeal bone.

Figure 10D:
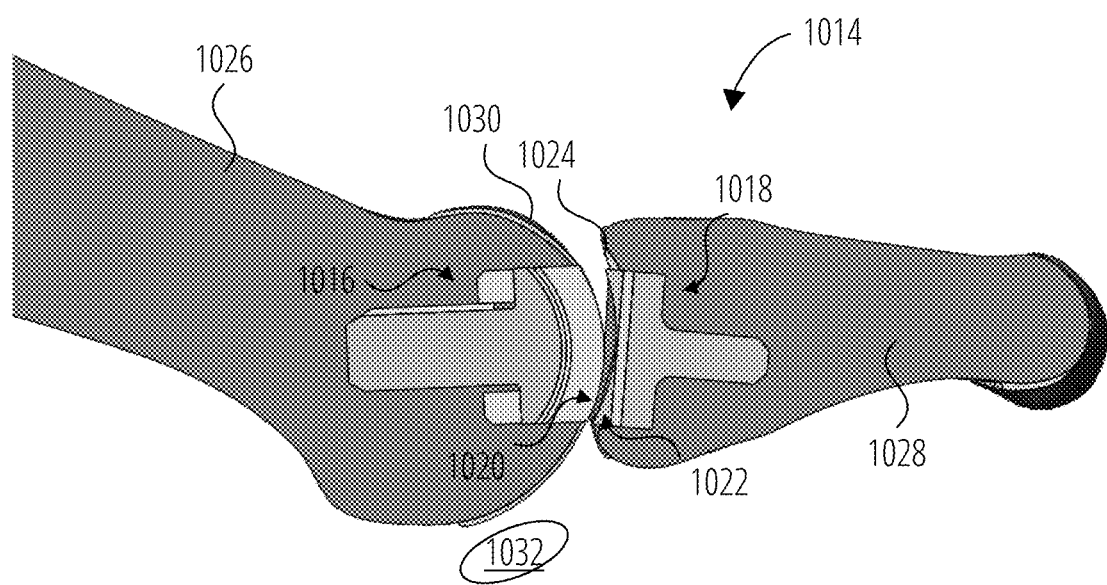
FIG. 10D illustrates an example of a total toe implant system, comprising a first implant at least partially disposed in a metatarsal bone and a second implant at least partially disposed in a phalangeal bone, according to embodiments described herein.

FIG. 10D illustrates an example of an implant system 1014, according to embodiments described herein. In some embodiments, the implant system 1014 is configured to be used in cases where there is damage cartilage on both a metatarsal bone 1026 and a phalanges bone 1028, necessitating a repair of both surfaces. In some embodiments, the implant system 1014 comprises a metatarsophalangeal implant 1016 and a phalangeal implant 1018. In some embodiments, the metatarsophalangeal implant 1016 is implant 102, implant 202, implant 302, implant 502, implant 602, implant 702, implant 802, implant 902, implant 1002, or any combination thereof. In some embodiments, the metatarsophalangeal implant 1016 comprises a first articulating surface 1020 disposed on the outer surface of the metatarsophalangeal implant 1016. In some embodiments, the first articulating surface 1020 is configured with a convex curvature, wherein a radius of the convex curvature is equal to a radius of curvature of the second articulating surface 1022. In some embodiments, the first articulating surface 1020 is configured with a concave curvature, wherein a radius of the concave curvature is equal to the radius of curvature of the second articulating surface 1022. In some embodiments, the phalangeal implant 1018 comprises a second articulating surface 1022 disposed on an outer surface of the phalangeal implant 1018. In some embodiments, the second articulating surface 1022 is configured with a concave curvature, wherein a radius of the concave curvature is equal to the radius of curvature of the first articulating surface 1020. In some embodiments, the second articulating surface 1022 is configured with a convex curvature, wherein a radius of the convex curvature is equal to the radius of curvature of the first articulating surface 1020. In some embodiments, the implant system 1014 is configured to be used in a metacarpophalangeal joint.

In some embodiments, the first articulating surface 1020 and the second articulating surface 1022 are configured to articulate against one another when the joint is flexed. In some embodiments, the second articulating surface 1022 is configured to articulate against a metatarsal articular cartilage 1030 on the metatarsal bone 1026 when the joint is flexed. In some embodiments, the first articulating surface 1020 is configured to articulate against a phalangeal articular cartilage 1024 on the phalanges bone 1028 when the joint is flexed.

In some embodiments, the metatarsophalangeal implant 1016 is configured to be disposed in the metatarsal bone 1026 such that at least a portion of the metatarsal articular cartilage 1030 is maintained, allowing a sesamoid bone 1032 to articulate against the metatarsal bone 1026. Maintaining articulation between the sesamoid bone 1032 and the metatarsal articular cartilage 1030 may be advantageous for maintaining balance and mobility over other implant insertion method that resect the entire head of the metatarsal bone 1026.

FIG. 11A-FIG. 11F illustrate various embodiments of an implant 1102 having a platform 1104 disposed between a head portion 1106 and a post portion 1108, wherein the implant comprises various head portion thicknesses 1110 and a post portion 1108 having various corresponding post diameters 1112 and post lengths 1114. In some embodiments, the platform 1104 is entirely porous. In some embodiments, the platform 1104 is partially porous. In some embodiments, the platform 1104 has a porous outer surface. In some embodiments, the platform 1104 is configured to promote bone ingrowth into the plug. In some embodiments, the post portion 1108 is entirely porous. In some embodiments, the post portion 1108 has a porous outer surface. In some embodiments, the post portion 1108 is partially porous. In some embodiments, the entire implant 1102 is porous.

In some embodiments, the post portion 1108 and the platform 1104 are a single component. In some embodiments, the head portion 1106, the platform 1104, and the post portion 1108 are a single component. In some embodiments, the head portion 1106 comprises the first layer 108 and the second layer 112 described in reference to FIG. 1A. In some embodiments, the head portion 1106 comprises the first layer 108 described in reference to FIG. 1A. In some embodiments, the head portion 1106 comprises the first layer 108, the second layer 112, and the third layer 114 described in reference to FIG. 1A. In some embodiments, the head portion 1106 comprises a first surface 1116. In some embodiments, the first surface 1116 is lubricious.

For example, in an exemplary embodiment shown in FIG. 11A, the post diameter 1112 is smaller than the post length 1114 and the head portion thickness 1110, while the post length 1114 is longer than the head portion thickness 1110. In another non-limiting exemplary embodiment shown in FIG. 11B, the post diameter 1112 is the same length as or longer than the post length 1114 and smaller than the head portion thickness 1110, while the post length 1114 is shorter than the head portion thickness 1110. In another non-limiting exemplary embodiment shown in FIG. 11C, the post diameter 1112 is the longer than the post length 1114 and the head portion thickness 1110, while the post length 1114 is shorter than the head portion thickness 1110. In another non-limiting exemplary embodiment shown in FIG. 11D, the post diameter 1112 is the same or shorter than the post length 1114 and longer than the head portion thickness 1110, while the post length 1114 is longer than the head portion thickness 1110. In another non-limiting exemplary embodiment shown in FIG. 11E, the post diameter 1112 is shorter than the post length 1114 and longer than the head portion thickness 1110, while the post length 1114 is longer than the head portion thickness 1110. In another non-limiting exemplary embodiment shown in FIG. 11F, the post diameter 1112 is the shorter than the post length 1114 and shorter than the head portion thickness 1110, while the post length 1114 is longer than the head portion thickness 1110.

In some embodiments, the ratio of the post diameter 1112 to the post length 1114 is 1:1, 1.5:1, 1:1.5, 2:1, 3:1, 4:1, 5:1 1:2, 1:3, 1:4, or 1:5. In some embodiments, the ratio of the post diameter 1112 to the head portion thickness 1110 is 1:1, 1.5:1, 1:1.5, 2:1, 3:1, 4:1, 5:1 1:2, 1:3, 1:4, or 1:5. In some embodiments, the ratio of the post length 1114 to the head portion thickness 1110 is 0.5:1, 1:1, 1.5:1, 1:1.5, 2:1, 3:1, 4:1, 5:1 1:2, 1:3, 1:4, or 1:5.

In some embodiments, the ratio of the thickness of the head portion 1106 to a diameter of the post portion 1108 is between 1:1 to 1:5. In some embodiments, the ratio of the thickness of the head portion 1106 to the diameter of the post portion 1108 is between 1:1 to 1:3. In some embodiments, the ratio of the thickness of the head post portion 1108 to the diameter of the post head portion 1106 is between 1.0:1.2 to 1.0:1.8.

In some embodiments, the ratio of a diameter of the head portion 1106 to a diameter of the post portion 1108 is between 1.0:1.0 to 1.0:2.5. In some embodiments, the ratio of the diameter of the head post portion 1108 to the diameter of the post head portion 1106 is between 1.0:1.5 to 1.0:2.25. In some embodiments, the ratio of the diameter of the head post portion 1108 to the diameter of the post head portion 1106 is between 1.0:1.6 to 1.0:1.8.

In some embodiments, the ratio of the length of the post portion 1108 to the thickness of the head portion 1106 is between 1.0:0.3 to 1.0:7.0. In some embodiments, the ratio of the length of the post portion 1108 to the thickness of the head portion 1106 is between 1.0:0.5 to 1.0:5.0. In some embodiments, the ratio of the length of the post portion 1108 to the thickness of the head portion 1106 is between 1.0:1.2 to 1.0:1.7.

In some embodiments, the length of the post portion 1108 is between 6-20 mm. In some embodiments, the length of the post portion 1108 is between 8.2-8.4 mm. In some embodiments, length of the post portion 1108 is between 4-10 mm. In some embodiments, the diameter of the post portion 1108 is between 4-8 mm. In some embodiments, the diameter of the post portion 1108 is between 4.5-7.0 mm.

In some embodiments, the thickness of the head portion 1106 is between 3-20 mm. In some embodiments, the thickness of the head portion 1106 is between 4-12 mm. In some embodiments, the thickness of the head portion 1106 is between 5-7 mm. In some embodiments, the diameter of the head portion 1106 is between 4-25 mm. In some embodiments, the diameter of the head portion 1106 is between 6-18 mm. In some embodiments, the diameter of the head portion 1106 is between 8-12 mm.

In some embodiments, the implant 1102 is selected from a group comprising a metatarsal implant, a metacarpal implant, and a phalangeal implant.

Figure 12A:
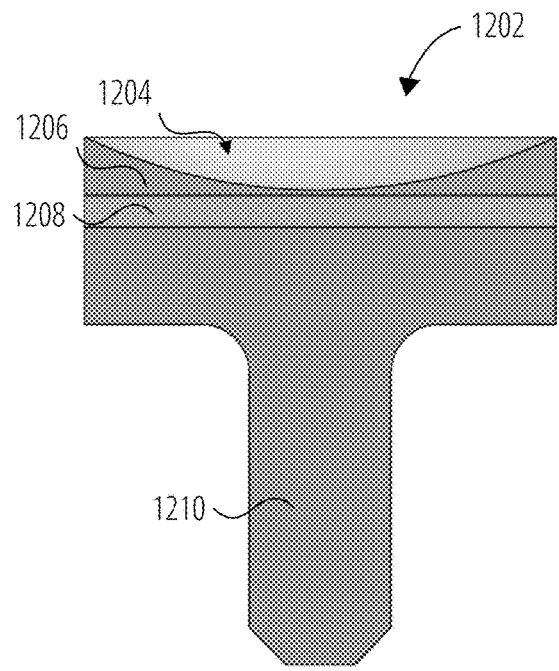
FIG. 12A illustrates an example of a phalangeal joint implant, according to embodiments described herein.
Figure 12B:
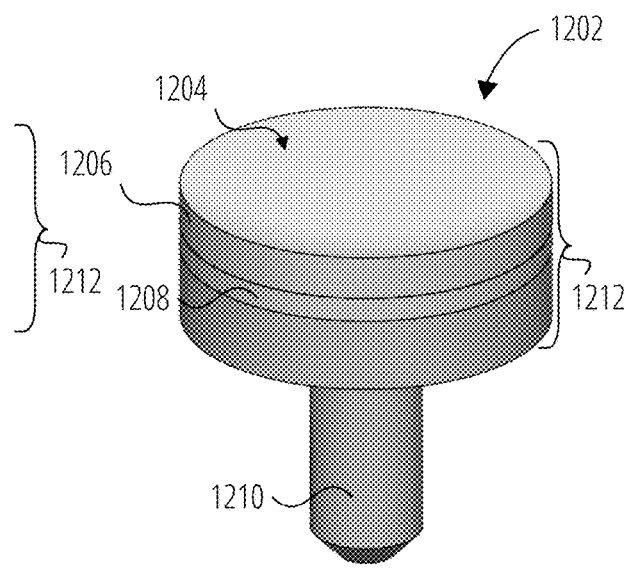
FIG. 12B illustrates an isometric view of the phalangeal joint implant of FIG. 12A, according to embodiments described herein.
Figure 12C:
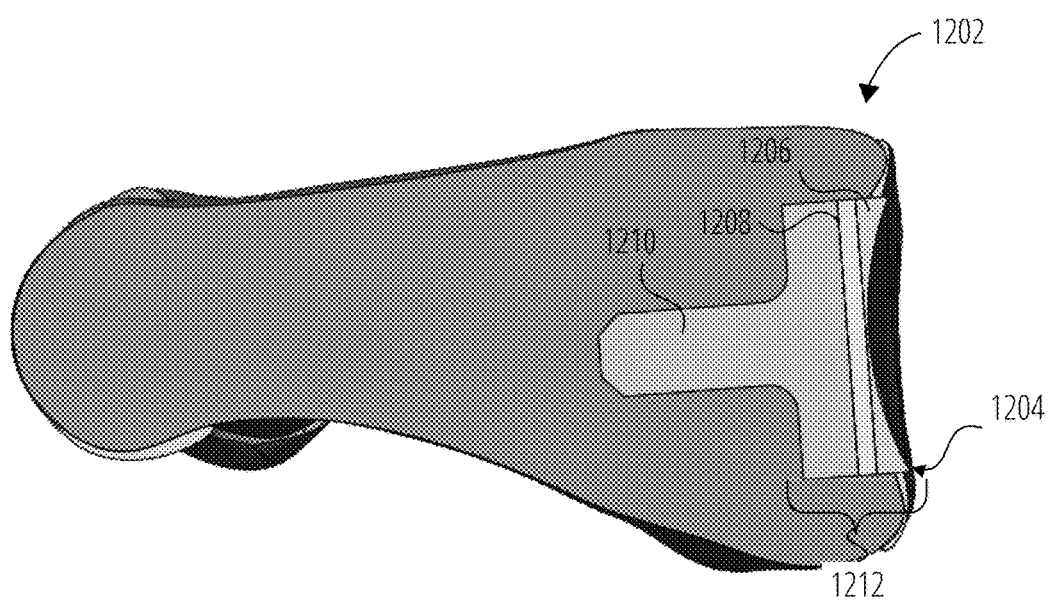
FIG. 12C illustrates an example of the phalangeal joint implant of FIG. 12A at least partially disposed in a phalangeal bone, according to embodiments described herein.

FIG. 12A, FIG. 12B, and FIG. 12C illustrate a planar view, an isometric view, and a bisecting view of a phalangeal joint implant 1202, respectively, according to embodiments described herein. In some embodiments, the phalangeal joint implant 1202 comprises a first surface 1204 configured to articulate with cartilage on a corresponding metatarsal bone, a corresponding implant disposed in the metatarsal bone, or at least partially with a corresponding implant disposed in the metatarsal bone and articulating cartilage surrounding the implant in the metatarsal bone. In some embodiments, the phalangeal joint implant 1202 comprises the first surface 1204 configured to contact and articulate with cartilage on a metacarpal bone. In some embodiments, the first surface 1204 is configured to interface with a metatarsophalangeal implant. In some embodiments, the first surface 1204 is configured to interface with a metacarpophalangeal implant. For example, the first surface 1204 may have a concave curvature. In an alternative example, the first surface 1204 may have a convex curvature.

In some embodiments, the phalangeal joint implant 1202 comprises a first layer 1206 and a second layer 1208. In some embodiments, the first layer 1206 comprises a lubricous material. In some embodiments, the first layer 1206 is constructed from a material that provides the lubricious and compliant first surface 1204 and a non-lubricious surface undersurface which interfaces with the second layer 1208. In some embodiments, the phalangeal joint implant 1202 comprises a head portion 1212 and a post portion 1210. In some embodiments, the post portion 1210 comprises a first diameter. In some embodiments, the head portion 1212 comprises a second diameter which is greater than the first diameter of the post portion. In some embodiments, the head portion 1212 comprises a second diameter which is less than the first diameter of the post portion. In some embodiments, the head portion 1212 comprises a second diameter which is equal to the first diameter of the post portion.

FIG. 13A illustrates an example of an implant drill bit 1302 according to embodiments described herein. In some embodiments, the implant drill bit 1302 is configured to mate with an implant. In some embodiments, the implant drill bit 1302 is configured to at least partially dispose an implant into a bone. In some embodiments, the implant drill bit 1302 is configured to dispose an implant into a bone such that the proximal surface of the implant drill bit 1302 is flush with the surrounding articular surface of the bone. For example, the bone may be a metatarsal, phalangeal, or metacarpal bone.

In some embodiments, the implant drill bit 1302 has a cylindrical profile. In some embodiments, the implant drill bit 1302 has a conical profile. In some embodiments, the implant drill bit 1302 is a step drill bit. In some embodiments, the implant drill bit 1302 comprises a first drill portion 1304 and a second drill portion 1306 In some embodiments, the first drill portion 1304 comprises a proximal end and a distal end with an outer surfaced disposed therebetween. In some embodiments, the second drill portion 1306 comprises a proximal end and a distal end with an outer surface disposed therebetween. In some embodiments, the second drill portion 1306 is disposed at the proximal end of the first drill portion 1304. In some embodiments, the second drill portion 1306 is configured to have a larger diameter than the first drill portion 1304. In some embodiments, the a distal end of the first drill portion 1304 is configured to extend beyond a distal end of the second drill portion 1306. In some embodiments, the first drill portion 1304 and the second drill portion 1306 share a longitudinal axis.

In some embodiments, the first drill portion 1304 is configured to have a diameter that is equal to the diameter of a post portion of a metatarsophalangeal joint implant. In some embodiments, the first drill portion 1304 is configured to have a diameter that is greater than the diameter of a post portion of the metatarsophalangeal joint implant. In some embodiments, the metatarsophalangeal joint implant is implant 102, implant 202, implant 302, implant 502, implant 602, implant 702, implant 802, implant 902, implant 1002, implant 1102, or any combination thereof. In some embodiments, the second drill portion 1306 is configured to have a diameter that is equal to a head portion of the metatarsophalangeal joint implant. In some embodiments, the second drill portion 1306 is configured to have a diameter that is greater than the head portion of the metatarsophalangeal joint implant. In some embodiments, the metatarsophalangeal joint implant is implant 102, implant 202, implant 302, implant 502, implant 602, implant 702, implant 802, implant 902, implant 1002, implant 1102, or any combination thereof.

In some embodiments, the first drill portion 1304 is configured to be fixedly attached to the second drill portion 1306. In some embodiments, the first drill portion 1304 is configured to mate with the second drill portion 1306 through a second portion lumen 1322. In some embodiments, the first drill portion 1304 is configured to extend and retract from the second drill portion 1306 through the second portion lumen 1322. In some embodiments, the second drill portion 1306 comprises one or more second portion channels 1318. In some embodiments, the second portion channels 1318 are at least partially disposed in the outer surface of the second drill portion 1306 helically about the longitudinal axis of the implant drill bit 1302, such that the second portion channels 1318 do not pass all the way through to the second portion lumen 1322. In some embodiments, the second portion channels 1318 are at least partially disposed in the outer surface of the second drill portion 1306 such that they do pass all the way through to the second portion lumen 1322. In some embodiments, the second portion channels 1318 are configured to transport material from the distal end of the second drill portion 1306 to the proximal end of the second drill portion 1306. In some embodiments, the second portion channels 1318 are configure to have a v-shaped profile, a rectangular profile, a semicircular profile, or any other polygonal profile.

In some embodiments, the implant drill bit 1302 comprises a drill bit connector 1316 disposed at the proximal end of the implant drill bit 1302. In some embodiments, the drill bit connector 1316 is configured to removably couple the implant drill bit 1302 to a surgical drill driver (not shown in figures). In some embodiments, the drill bit connector 1316 is configured to couple with surgical drill drivers known to those skilled in the art. In some embodiments, the implant drill bit 1302 comprises a depth stop 1308 disposed at the proximal end of the second drill portion 1306 along the longitudinal axis of the implant drill bit 1302. In some embodiments, the depth stop 1308 is configured to interface with a drill guide (not shown in figures) to indicate when the implant drill bit 1302 has reached a certain depth. In some embodiments, the depth stop 1308 has a triangular profile, a square profile, a hexagonal profile, an octagonal profile, a circular profile, or any other polygonal profile. In some embodiments, the profile of the depth stop 1308 is larger than then diameter of the second drill portion 1306 so as to allow the depth stop 1308 to interface with the drill guide while the second drill portion 1306 does not contact the drill guide.

FIG. 13B illustrates a planar view of the first drill portion 1304 and the second drill portion 1306 of the implant drill bit 1302. In some embodiments, the first drill portion 1304 comprises one or more post cutting blades 1310. In some embodiments, the post cutting blades 1310 are configured to remove cartilage and bone when the implant drill bit 1302 is inserted into a bone. In some embodiments, the post cutting blades 1310 are configured at a distal end of a first portion channel 1320, such that any material cut by the post cutting blade post cutting blades 1310 is transported from the distal end of the first drill portion 1304 to the proximal end of the first drill portion 1304 through the first portion channel 1320. In some embodiments, the first portion channel 1320 is at least partially disposed in the outer surface of the first drill portion 1304 helically about the longitudinal axis of the first drill portion 1304 such that it does not pass all the way through the first drill portion 1304. In some embodiments, the first portion channel 1320 is at least partially disposed in the outer surface of the first drill portion 1304 helically about the longitudinal axis of the first drill portion 1304 such that it does pass all the way through the first drill portion 1304. In some embodiments, the first drill portion 1304 is configured with one or more first portion channels 1320.

In some embodiments, the second drill portion 1306 comprises one or more head cutting blades 1312 and one or more cartilage incising blades 1314. In some embodiments, the head cutting blades 1312 are configured to remove cartilage and bone when the implant drill bit 1302 is inserted into a bone. In some embodiments, the head cutting blades 1312 are configured at a distal end of the second portion channel 1318, such that any material cut by the head cutting blades 1312 is transported from the distal end of the second drill portion 1306 to the proximal end of the second drill portion 1306 through the second portion channels 1318. In some embodiments, the second drill portion 1306 comprises one or more cartilage incising blades 1314. In some embodiments, the cartilage incising blades 1314 comprise two or more diametrically opposed single cutting blades arranged radially about the longitudinal axis of the plant drill bit 1302. In some embodiments, the cartilage incising blade cartilage incising blades 1314 are configured to cut a clean margin along a dorsal and plantar edge of a cartilage surface in a metatarsal joint, so as to minimize tissue damage.

FIG. 13C illustrates an isometric view of the first drill portion 1304 and the second drill portion 1306 of the implant drill bit 1302.

Figure 13D:
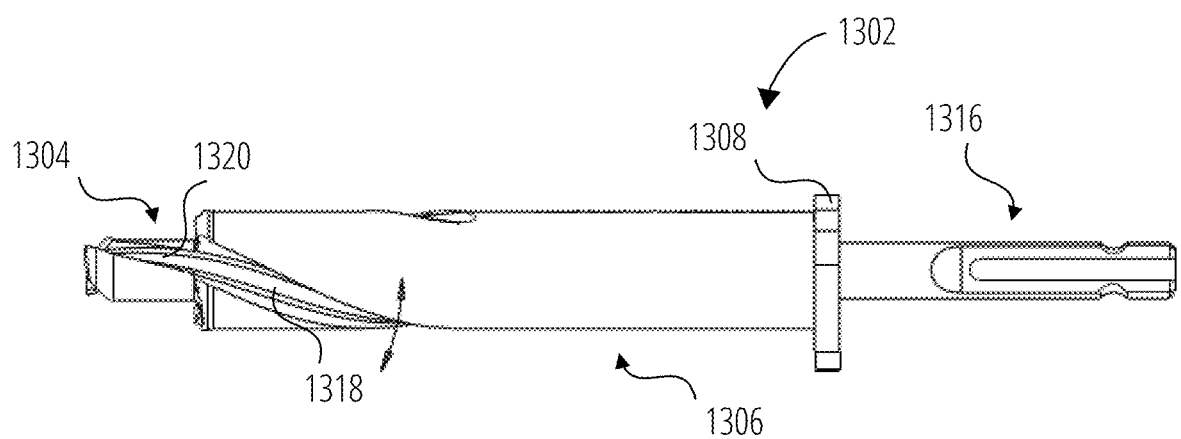
FIG. 13D illustrates an aspect of the subject matter in accordance with one embodiment.

FIG. 13D illustrates a schematic drawing of the implant drill bit 1302. In some embodiments, the second portion channel 1318 and first portion channel 1320 are configured as a single channel at least partially disposed helically along the outer surface of the second drill portion 1306 and the first drill portion 1304.

Figure 14A:
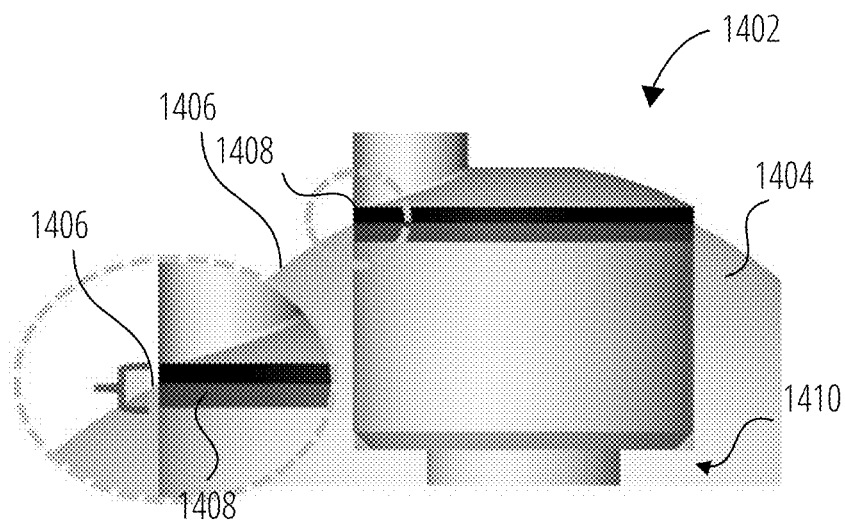
FIG. 14A illustrates an aspect of the subject matter in accordance with one embodiment.

FIG. 14A illustrates an example of a trial implant 1402 placed at a depth suitable for an implantation of a metatarsophalangeal implant, according to embodiments described herein. In some embodiments, the trial implant 1402 is configured to be inserted into an implant site 1410 in a bone 1404. In some embodiments, the bone 1404 is a metatarsal bone, phalangeal bone, or metacarpal bone. In some embodiments, the implant site 1410 is created by using an implant drill bit. In some embodiments, the implant drill bit is an implant drill bit 1302.

In some embodiments, the trial implant 1402 comprises a defined etched band 1408 that is disposed around a circumference of the trial implant 1402. In some embodiments, the defined etched band 1408 is configured to confirm that the implant site 1410 is of a depth suitable for the implantation of a metatarsophalangeal implant by visually indicating the position of a cartilage articular surface 1406 relative to the defined etched band 1408 when the trial implant 1402 is placed within the implant site 1410. In some embodiments, a surgeon is able to visually inspect the trial implant 1402 placed in the implant site 1410 and identify the relative location of the cartilage articular surface 1406 and the defined etched band 1408. In some embodiments, the trial implant 1402 is placed at depth suitable for the implantation of the metatarsophalangeal implant when the surgeon is able to see that the cartilage articular surface 1406 is at or distal to a proximal edge of the defined etched band 1408 and at or proximal to a distal edge of the defined etched band 1408.

Figure 14B:
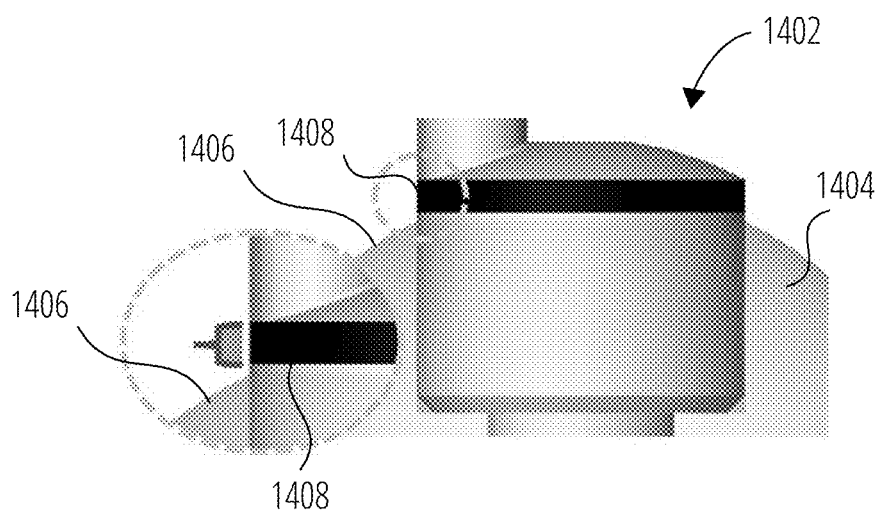
FIG. 14B illustrates an aspect of the subject matter in accordance with one embodiment.

FIG. 14B illustrates an example of the trial implant 1402 placed at a depth that is not suitable for the implantation of the metatarsophalangeal implant, according to embodiments described herein. In some embodiments, a surgeon is able to visually inspect the trial implant 1402 placed in the implant site 1410 and identify the relative location of the cartilage articular surface 1406 and the defined etched band 1408. In some embodiments, the trial implant 1402 is placed at depth that is not suitable for the implantation of the metatarsophalangeal implant when the surgeon is able to see the entirety of the defined etched band 1408 because the cartilage articular surface 1406 is below the lower edge of the defined etched band 1408. In some embodiments, the trial implant 1402 is placed at depth that is not suitable for the implantation of the metatarsophalangeal implant when the surgeon is not able to see any of the defined etched band 1408 because the cartilage articular surface 1406 is above the upper edge of the defined etched band 1408.

Methods of Placing a Metatarsophalangeal Joint Implant

Described herein are methods used to surgically place a metatarsophalangeal joint implant. The metatarsophalangeal joint implant is designed to replace damaged articulating cartilage and bone on a metatarsal head in patients with degenerative or post-traumatic osteoarthritis. In some embodiments, the method comprises accessing the metatarsal joint by making an incision over the metatarsal joint along the metatarsal axis on the dorsal side of a patient's foot. Care should be taken to avoid the neurovascular bundle an the extensor tendons when making the incision. In some embodiments, the method comprises releasing the lateral and medial soft tissues or sesamoid bones to gain access to the central region of the metatarsal head. In some embodiments, the method comprises a cheilectomy to gain access to the central region of the metatarsal head. When a cheilectomy is performed, care should be taken to minimize dorsal bone removal on the metatarsal head.

In some embodiments, the method comprises sizing the metatarsophalangeal joint implant to repair the damaged cartilage and bone on the metatarsal head. In some embodiments, the method comprises sizing a pin guide such that when pressed against the damaged cartilage the pin guide completely covers the damaged cartilage while maintaining a border of healthy bone around the pin guide of at least 2 mm on all sides. Leaving, at minimum, a 2 mm border of bone may be advantageous over current methods of resecting the metatarsal head, as it allows for more natural, healthy bone to remain in the patient. In some embodiments, the metatarsophalangeal joint implant is sized to have a diameter between 6-8 mm, 8-10 mm, 10-12 mm, 12-14 mm, 14-16 mm, 16-18 mm, 18-20 mm, or any combination thereof. In some embodiments, the pin guide is configured to have the same diameter as the metatarsophalangeal joint implant. Maintaining the balance and integrity of the surrounding soft tissues, including ligaments, tendons, and the joint capsule, is crucial for the proper function and stability of the implant. Surgical techniques must prioritize the preservation of these structures to avoid compromising joint function and achieving optimal postoperative outcomes. In some embodiments, the method comprises contacting the pin guide with the cartilage with at least three points of contact to ensure stable placement of the pin guide.

In some embodiments, the method comprises inserting an alignment pin into the subchondral bone using a surgical drill. In some embodiments, the alignment pin is seated in the subchondral bone to a depth such that the alignment pin is stable. In some embodiments, the alignment pin is seated at a depth of 30-40 mm or 40-50 mm. In some embodiments, the alignment pin is placed entirely within the damaged cartilage. In some embodiments, the alignment pin is placed perpendicular to the damaged cartilage.

In some embodiments, the method comprises placing an implant drill guide around an implant drill bit. In some embodiments, the implant drill bit is the implant drill bit 1302. In some embodiments, the method comprises disposing the implant drill guide and the implant drill bit around the guide pin and contacting the implant drill guide against the metatarsal cartilage surface. In some embodiments, the method comprises inserting the implant drill bit into the subchondral bone while spinning at high speed and under constant saline irrigation. In some embodiments, the method comprises continuing to insert the implant drill bit into the subchondral bone until an implant drill bit depth stop contacts the implant drill guide. In some embodiments, the method comprises removing the implant drill bit and implant drill guide from the guide pin and exposing an implant site.

In some embodiments, the method comprises evaluating the implant site to ensure proper depth and sizing. In some embodiments, the method comprises inserting a trial implant 1402 into the exposed implant site. In some embodiments, the method comprises ensuring the dorsal and plantar cartilage edges of the implant site are within a defined etched band around the trial implant 1402. In some embodiments, the method comprises removing the trial implant 1402 from the implant site after proper depth and sizing are confirmed.

In some embodiments, the method comprises removing the metatarsophalangeal joint implant from its packaging and inspecting the implant for any visible damage. In some embodiments, the method comprises partially placing the metatarsophalangeal joint implant into the implant site with hand pressure only. In some embodiments, the metatarsal joint implant is implant 102, implant 202, implant 302, implant 502, implant 602, implant 702, implant 802, implant 902, implant 1002, implant 1102, or any combination thereof. In some embodiments, the method comprises placing an implant tamp over an articular surface of the metatarsophalangeal joint implant and using a surgical mallet to apply repeated impacts to the distal end of the implant tamp, driving the metatarsophalangeal joint implant into the implant site. In some embodiments, the method comprises visually inspecting the metatarsophalangeal joint implant to ensure that an outer edge of the metatarsophalangeal joint implant is flush to the dorsal and plantar cartilage edges. In some embodiments, the method comprises visually inspecting the metatarsophalangeal joint implant to ensure that the outer edge of the metatarsophalangeal joint implant is proud to the dorsal and plantar cartilage edges, such that the metatarsophalangeal joint implant is not so proud as to extend beyond the defined etched band of the implant trial.

Selected Embodiments

Embodiment 1. An implant adapted to be placed in an articulating surface of a metatarsophalangeal joint, the implant comprising: a head portion extending for a thickness from a first surface to a second surface and comprising a plurality of layers located between the first surface and the second surface, wherein the first surface is lubricious; and a post portion extending for a length from the second surface of the head portion to a distal end.

Embodiment 2. An implant adapted to be placed in an articulating surface of a metacarpophalangeal joint, the implant comprising: a head portion extending for a thickness from a first surface to a second surface and comprising a plurality of layers located between the first surface and the second surface, wherein the first surface is lubricious; and a post portion extending for a length from the second surface of the head portion to a distal end.

Embodiment 3. The implant of embodiment 1 or 2, wherein a ratio of the thickness of the head portion to a diameter of the post portion is between 1:1 to 1:5

Embodiment 4. The implant of embodiment 3, wherein the ratio of the thickness of the head portion to the diameter of the post portion is between 1:1 to 1:3.

Embodiment 5. The implant of embodiment 4, wherein the ratio of the thickness of the head portion to the diameter of the post portion is between 1.0:1.2 to 1.0:1.8.

Embodiment 6. The implant of embodiment 1 or 2, wherein a ratio of a diameter of the head portion to a diameter of the post portion is between 1.0:1.0 to 1.0:2.5.

Embodiment 7. The implant of embodiment 6, wherein the ratio of the diameter of the head portion to the diameter of the post portion is between 1.0:1.5 to 1.0:2.25.

Embodiment 8. The implant of embodiment 7, wherein the ratio of the diameter of the head portion to the diameter of the post portion is between 1.0:1.6 to 1.0:1.8.

Embodiment 9. The implant of embodiment 1 or 2, wherein a ratio of the length of the post portion to the thickness of the head portion is between 1.0:0.3 to 1.0:7.0.

Embodiment 10. The implant of embodiment 9, wherein the ratio of the length of the post portion to the thickness of the head portion is between 1.0:0.5 to 1.0:5.0.

Embodiment 11. The implant of embodiment 10, wherein the ratio of the length of the post portion to the thickness of the head portion is between 1.0:1.2 to 1.0:1.7.

Embodiment 12. The implant of any one of embodiments 1 to 11, wherein the length of the post is between 6-20 mm.

Embodiment 13. The implant of embodiment 12, wherein the length of the post is between 8.2-8.4 mm.

Embodiment 14. The implant of any one of embodiments 1 to 13, wherein a diameter of the post is between 4-10 mm.

Embodiment 15. The implant of embodiment 14, wherein the diameter of the post is between 4-8 mm.

Embodiment 16. The implant of embodiment 15, wherein the diameter of the post is between 4.5-7.0 mm.

Embodiment 17. The implant of any one of embodiments 1 to 16, wherein the thickness of the head portion is between 3-20 mm.

Embodiment 18. The implant of embodiment 17, wherein the thickness of the head portion is between 4-12 mm.

Embodiment 19. The implant of embodiment 18, wherein the thickness of the head portion is between 5-7 mm.

Embodiment 20. The implant of embodiment 18, wherein a diameter of the head portion is between 4-25 mm.

Embodiment 21. The implant of embodiment 20, wherein the diameter of the head portion is between 6-18 mm.

Embodiment 22. The implant of embodiment 21, wherein the diameter of the head portion is between 8-12 mm.

Embodiment 23. The implant of any one of embodiments 1 to 22, wherein the first surface comprises a first curvature and a second curvature, the first curvature extending along a first axis, the second curvature extending along a second axis, wherein the first axis and the second axis intersect at a single point, and wherein the first axis and the second axis are orthogonal to a longitudinal axis of the implant.

Embodiment 24. The implant of any one of embodiments 1 to 23, wherein the implant is configured to articulate with native cartilage of a corresponding bone.

Embodiment 25. The implant of embodiment 25, wherein the corresponding implant has an articulating surface comprising a material selected from the group consisting of a lubricious material, cobalt-chromium, titanium, Ti6Al4V, ultra-high molecular weight polyethylene, or any combination thereof.

Embodiment 26. The implant of any one of embodiments 1 to 25, further comprising a cavity at least partially disposed into the distal end of the post portion, wherein the cavity extends along a longitudinal axis of the post portion.

Embodiment 27. The implant of embodiment 26, further comprising a post extension having a first end configured to be at least partially disposed in bone and a second end configured to mate with the cavity of the post portion.

Embodiment 28. The implant of any one of embodiments 1 to 27, further comprising a foot portion extending from the head portion in a direction towards the distal end of the post portion.

Embodiment 29. The implant of embodiment 28, wherein the first surface of the head portion extends along the length of the foot portion.

Embodiment 30. The implant of any one of embodiments 1 to 29, wherein the first curvature and the second curvature are both convex.

Embodiment 31. The implant of any one of embodiments 1 to 30, wherein the first curvature and the second curvature are both concave.

Embodiment 32. The implant of any one of embodiments 1 to 31, wherein the first curvature is convex and the second curvature is concave.

Embodiment 33. The implant of any one of embodiments 1 to 32, wherein the first curvature is concave and the second curvature is convex.

Embodiment 34. The implant of any one of embodiments 1 to 33, wherein the first curvature has a more acute angle than the second curvature.

Embodiment 35. The implant of any one of embodiments 1 to 34, further comprising a first lumen extending at least partially through a latitudinal axis of the post portion.

Embodiment 36. The implant of embodiment 35, further comprising a second lumen extending at least partially through the latitudinal axis of the post portion.

Embodiment 37. The implant of embodiment 36, wherein the first lumen is oriented perpendicular to the second lumen.

Embodiment 38. The implant of any one of embodiments 1 to 37, further comprising one or more fins extending radially from an outer surface of the post portion.

Embodiment 39. The implant of embodiment 38, wherein the one or more fins comprise a shape memory material.

Embodiment 40. The implant of embodiment 39, wherein the shape memory material is nitinol.

Embodiment 41. A system adapted to be placed in an articulating surface of a metatarsophalangeal joint, the system comprising: the metatarsophalangeal implant of embodiment 1; and a phalangeal implant configured to articulate with the implant of embodiment 1.

Embodiment 42. A method for disposing an implant at least partially into a metatarsal bone in a metatarsophalangeal joint, the method comprising the steps of: disposing a recess through an articular surface of a metatarsal head of the metatarsal bone such that the metatarsal head maintains articulation with a sesamoid bone; and inserting the implant into the metatarsal bone at an angle between 15-30 degrees with respect to a longitudinal axis of the metatarsal bone.

Embodiment 43. A method for disposing an implant at least partially into a metacarpal bone in a metacarpophalangeal joint, the method comprising the steps of: disposing a recess through an articular surface of a metacarpal head of the metatarsal bone such that the metacarpal head maintains articulation with a sesamoid bone; and inserting the implant into the metacarpal bone.

Embodiment 44. The method of embodiment 42 or 43, wherein the implant comprises a head portion and a post portion extending from the head portion, wherein the implant further comprises a foot portion extending from the head portion towards a distal end of the foot portion, thereby creating an articulating surface with a phalangeal bone.

Embodiment 45. The method of embodiment 42 or 43, wherein the implant comprises a head portion and a post portion extending from the head portion, wherein the implant further comprises a cavity at least partially disposed into a distal end of the post portion, wherein the cavity extends along a longitudinal axis of the post portion.

Embodiment 46. The method of embodiment 42 or 43, wherein the recess is formed by contacting a distal end of a drill bit with an articular surface of the metatarsal bone, and wherein the method further comprises the steps of: forming a first cavity of the recess with a first drill bit portion having a first drill bit diameter about equal to a diameter of the post portion of the implant; forming a second cavity of the recess with a second drill bit portion having a second drill diameter about equal to a diameter of the head portion of the implant, wherein a distal end of the first drill bit portion extends distally from a distal end of the second drill bit portion, and wherein the first drill bit diameter is smaller than the first drill bit diameter.

Embodiment 47. The method of embodiment 46, wherein the drill bit comprises a depth guide configured to contact a drill guide when then drill bit reaches a final depth of the recess.

Embodiment 48. The method of embodiment 45, further wherein the implant comprises a post extension having a first end configured to be at least partially disposed in the metatarsal bone and a second end configured to couple with the cavity of the post portion.

Embodiment 49. The method of embodiment 44, wherein a first surface of the head portion extends along the length of the foot portion.

Embodiment 50. The method of embodiment 42 or 43, wherein the implant comprises a head portion and a post portion extending from the head portion, wherein a first surface of the head portion is convex having a substantially spherical curvature.

Embodiment 51. The method of embodiment 42 or 43, wherein the implant comprises a head portion and a post portion extending from the head portion, wherein a first surface of the head portion comprises a first curvature and a second curvature.

Embodiment 52. The method of embodiment 51, wherein the first curvature has a more acute angle than the second curvature.

Embodiment 53. The method of embodiment 42 or 43, further comprising inserting a trial implant into the recess to visually inspect a relative location of the articular surface and the trial implant.

Embodiment 54. The method of embodiment 53, wherein the trial implant comprises a defined etched band disposed along a circumference of the trial implant.

Embodiment 55. The method of embodiment 54, wherein the articular surface is located proximally to a distal border of the defined etched band and distally to a proximal border of the defined etched band when the trial implant is inserted into the recess.

Embodiment 56. The method of embodiment 54, wherein the articular surface is aligned with the proximal edge of the defined etched band when the trial implant is inserted into the recess.

Embodiment 57. The method of embodiment 42, wherein the metatarsal head comprises at least 2 mm of bone surrounding the recess.

Embodiment 58. The method of embodiment 43, wherein the metacarpal head comprises at least 2 mm of bone surrounding the recess.

Embodiment 59. The method of any one of embodiments 42 to 58, further comprising visually evaluating a pin guide against the articular surface, such that the pin guide has a diameter that is equal to a diameter of the recess.

Embodiment 60. The method of embodiment 59, wherein the pin guide makes three points of contact against the articular surface.

Embodiment 61. The method of any one of embodiments 42 to 60, further comprising the step of inserting an alignment pin into the recess.

Embodiment 62. The method of embodiment 61, wherein the alignment pin is inserted into the recess to a depth where the alignment pin remains stable.

Embodiment 63. The method of embodiment 62, wherein the alignment pin is inserted into the recess to a depth to a depth of 30-40 mm or 40-50 mm.

Embodiment 64. The implant of any one of embodiments 1 to 40, wherein the first surface comprises a curvature oriented orthogonal to a longitudinal axis of the implant.

Certain examples of the present disclosure were described above. It is, however, expressly noted that the present disclosure is not limited to those examples, but rather the intention is that additions and modifications to what was expressly described herein are also included within the scope of the disclosed examples. Moreover, it is to be understood that the features of the various examples described herein were not mutually exclusive and may exist in various combinations and permutations, even if such combinations or permutations were not made express herein, without departing from the spirit and scope of the disclosed examples. In fact, variations, modifications, and other implementations of what was described herein will occur to those of ordinary skill in the art without departing from the spirit and the scope of the disclosed examples. As such, the disclosed examples are not to be defined only by the preceding illustrative description.

In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

The foregoing description of examples has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. An implant adapted to be placed in an articulating surface of a metatarsophalangeal joint, the implant comprising:
a head portion extending for a thickness from a first surface to a second surface and comprising a first layer extending from the first surface towards the second surface and a second layer extending from the first layer towards the second surface, wherein the first layer comprises a biphasic material comprising a polymer and water, and the second layer comprises a hydrophobic polymer; and
a post portion comprising a metal and extending for a length from the second surface of the head portion to a distal end, wherein a ratio of a diameter of the head portion to a diameter of the post portion is between 1.0:1.0 and 1.0:2.5.

2. The implant of claim 1, wherein the length of the post portion is between 6-20 mm.

3. The implant of claim 1, wherein the thickness of the head portion is between 3-20 mm.

4. The implant of claim 1, wherein the first surface comprises a first curvature and a second curvature, the first curvature extending along a first axis, the second curvature extending along a second axis, wherein the first axis and the second axis intersect at a single point, and wherein the first axis and the second axis are orthogonal to a longitudinal axis of the implant.

5. The implant of claim 1, further comprising a cavity at least partially disposed into the distal end of the post portion, wherein the cavity extends along a longitudinal axis of the post portion.

6. The implant of claim 1, further comprising a foot portion extending from the head portion in a direction towards the distal end of the post portion.

7. The implant of claim 1, wherein the first curvature and the second curvature are selected from a group comprising a concave curvature and a convex curvature.

8. The implant of claim 1, further comprising a first lumen extending at least partially through a latitudinal axis of the post portion.

9. The implant of claim 8, wherein the first surface comprises a curvature oriented orthogonal to a longitudinal axis of the implant.

10. The implant of claim 1, further comprising one or more fins extending radially from an outer surface of the post portion.

11. An implant adapted to be placed in an articulating surface of a metatarsophalangeal joint, the implant comprising:
a head portion extending for a thickness from a first surface to a second surface and comprising a first layer extending from the first surface towards the second surface and a second layer extending from the first layer towards the second surface, wherein the first layer comprises a biphasic material comprising a polymer and water, and the second layer comprises a hydrophobic polymer; and a post portion comprising a metal and extending for a length from the second surface of the head portion to a distal end, wherein a ratio of the length of the post portion to the thickness of the head portion is between 1.0:0.3 to 1.0:7.0.

12. The implant of claim 11, wherein a diameter of the post is between 4-10 mm.

13. The implant of claim 11, wherein a diameter of the head portion is between 4-25 mm.

14. The implant of claim 11, wherein the first surface comprises a first curvature and a second curvature, the first curvature extending along a first axis, the second curvature extending along a second axis, wherein the first axis and the second axis intersect at a single point, and wherein the first axis and the second axis are orthogonal to a longitudinal axis of the implant.

15. The implant of claim 14, wherein the first curvature and the second curvature are selected from a group comprising a concave curvature and a convex curvature.

16. The implant of claim 11, further comprising a cavity at least partially disposed into the distal end of the post portion, wherein the cavity extends along a longitudinal axis of the post portion.

17. The implant of claim 11, further comprising a foot portion extending from the head portion in a direction towards the distal end of the post portion.

18. The implant of claim 11, further comprising a first lumen extending at least partially through a latitudinal axis of the post portion.

19. The implant of claim 11, wherein the first surface comprises a curvature oriented orthogonal to a longitudinal axis of the implant.

20. The implant of claim 11, further comprising one or more fins extending radially from an outer surface of the post portion.

* * * * *